(12) United States Patent
Momose et al.

(10) Patent No.: US 7,719,701 B2
(45) Date of Patent: May 18, 2010

(54) INFORMATION PROCESSING DEVICE, PRINTING CONDITION SETTING METHOD, AND COMPUTER PRODUCT IN WHICH A GRAPHICAL REPRESENTATION EMULATING A PRINT OUTPUT IS DISPLAYED

(75) Inventors: Akira Momose, Chiba (JP); Mikane Tago, Kanagawa (JP); Taeko Tatebayashi, Tokyo (JP); Kenji Imai, Chiba (JP); Michiko Ogino, Tokyo (JP); Ryuichi Shimamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 96 days.

(21) Appl. No.: 11/496,583

(22) Filed: Aug. 1, 2006

(65) Prior Publication Data

US 2006/0262338 A1 Nov. 23, 2006

Related U.S. Application Data

(63) Continuation of application No. 09/988,140, filed on Nov. 19, 2001, now abandoned.

(30) Foreign Application Priority Data

Dec. 11, 2000 (JP) .............................. 2000-376718

(51) Int. Cl.
| | |
|---|---|
| *G06F 3/12* | (2006.01) |
| *G06K 15/02* | (2006.01) |
| *H04N 1/23* | (2006.01) |
| *H04N 1/00* | (2006.01) |
| *H04N 1/387* | (2006.01) |
| *G06F 3/01* | (2006.01) |

(52) U.S. Cl. ..................... 358/1.13; 358/1.1; 358/296; 358/401; 358/1.16; 358/450; 715/700

(58) Field of Classification Search ................. 358/1.13
See application file for complete search history.

(56) References Cited

U.S. PATENT DOCUMENTS 5,045,880 A 9/1991 Evanitsky et al.

(Continued)

FOREIGN PATENT DOCUMENTS

JP 11-149362 6/1999

(Continued)

OTHER PUBLICATIONS

Keiko Isa, "Master the word processor Creating New Year's cards (3) Keiko ISA Create text and print both sides-word 98 edition", Nikkei Personal Computing, No. 350, Nov. 29, 1999, pp. 346-351, 2 cover pages, (with partial English translation).

*Primary Examiner*—Twyler L Haskins
*Assistant Examiner*—Myles D Robinson
(74) *Attorney, Agent, or Firm*—Oblon, Spivak, McClelland, Maier & Neustadt, L.L.P.

(57) ABSTRACT

The CPU of a personal computer displays a list of one-click icons, each representing one or a plurality of printing functions, in the icon display area, and selects one one-click icon from the list of the one-click icons displayed in the icon display area, to automatically set a plurality of printing functions corresponding to the selected one-click icons.

30 Claims, 21 Drawing Sheets

U.S. PATENT DOCUMENTS

| | | | |
|---|---|---|---|
| 5,390,005 A * | 2/1995 | Kimoto et al. | 399/81 |
| 5,465,358 A | 11/1995 | Blades et al. | |
| 5,608,860 A | 3/1997 | Fitzpatrick et al. | |
| 5,614,993 A * | 3/1997 | Smith et al. | 399/81 |
| 5,717,501 A | 2/1998 | Iwamoto et al. | |
| 5,835,820 A * | 11/1998 | Martin et al. | 399/85 |
| 6,100,994 A * | 8/2000 | Schliekelmann et al. | 358/1.15 |
| 6,104,470 A | 8/2000 | Streefkerk et al. | |
| 6,177,941 B1 | 1/2001 | Haynes et al. | |
| 6,614,550 B1 | 9/2003 | Minagawa | |
| 6,618,061 B2 * | 9/2003 | Yamamoto | 715/817 |
| 6,621,590 B1 * | 9/2003 | Livingston | 358/1.15 |
| 6,830,390 B1 | 12/2004 | Hayashi | |
| 6,906,721 B1 | 6/2005 | Burrell | |
| 6,975,425 B1 | 12/2005 | Abe et al. | |
| 7,039,867 B1 | 5/2006 | Scheidig | |
| 7,057,747 B1 | 6/2006 | Minagawa | |
| 7,143,150 B1 | 11/2006 | Nuggehalli | |
| 7,251,045 B2 * | 7/2007 | Yamamura et al. | 358/1.13 |
| 7,475,362 B2 * | 1/2009 | Fujiyoshi | 715/838 |
| 2002/0021310 A1 | 2/2002 | Nakai et al. | |
| 2002/0099456 A1 * | 7/2002 | McLean | 700/83 |
| 2005/0162669 A1 | 7/2005 | Park et al. | |
| 2006/0218496 A1 * | 9/2006 | Kunori | 715/541 |
| 2008/0038032 A1 * | 2/2008 | Suzue | 400/62 |

FOREIGN PATENT DOCUMENTS

| | | |
|---|---|---|
| JP | 2000-71547 | 3/2000 |
| JP | 2000-71574 | 3/2000 |
| JP | 2000-112683 | 4/2000 |
| JP | 2000-122790 | 4/2000 |
| JP | 2000-137589 | 5/2000 |
| JP | 2000-222159 | 8/2000 |
| JP | 2000-227849 | 8/2000 |
| JP | 2000-242448 | 9/2000 |
| JP | 2000-267829 | 9/2000 |
| JP | 2000-312269 | 11/2000 |
| JP | 2002182871 A * | 6/2002 |
| JP | 2006302302 A * | 11/2006 |
| JP | 2008251046 A * | 10/2008 |

* cited by examiner

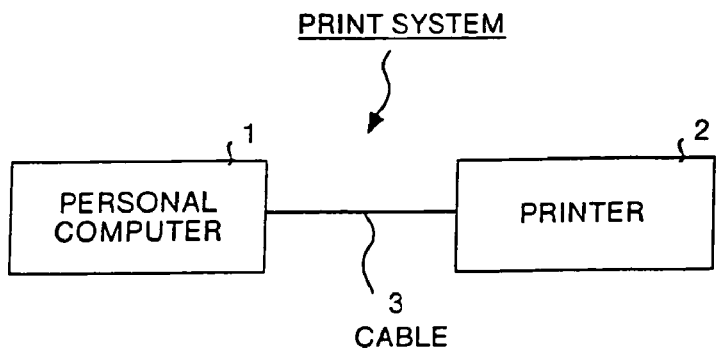
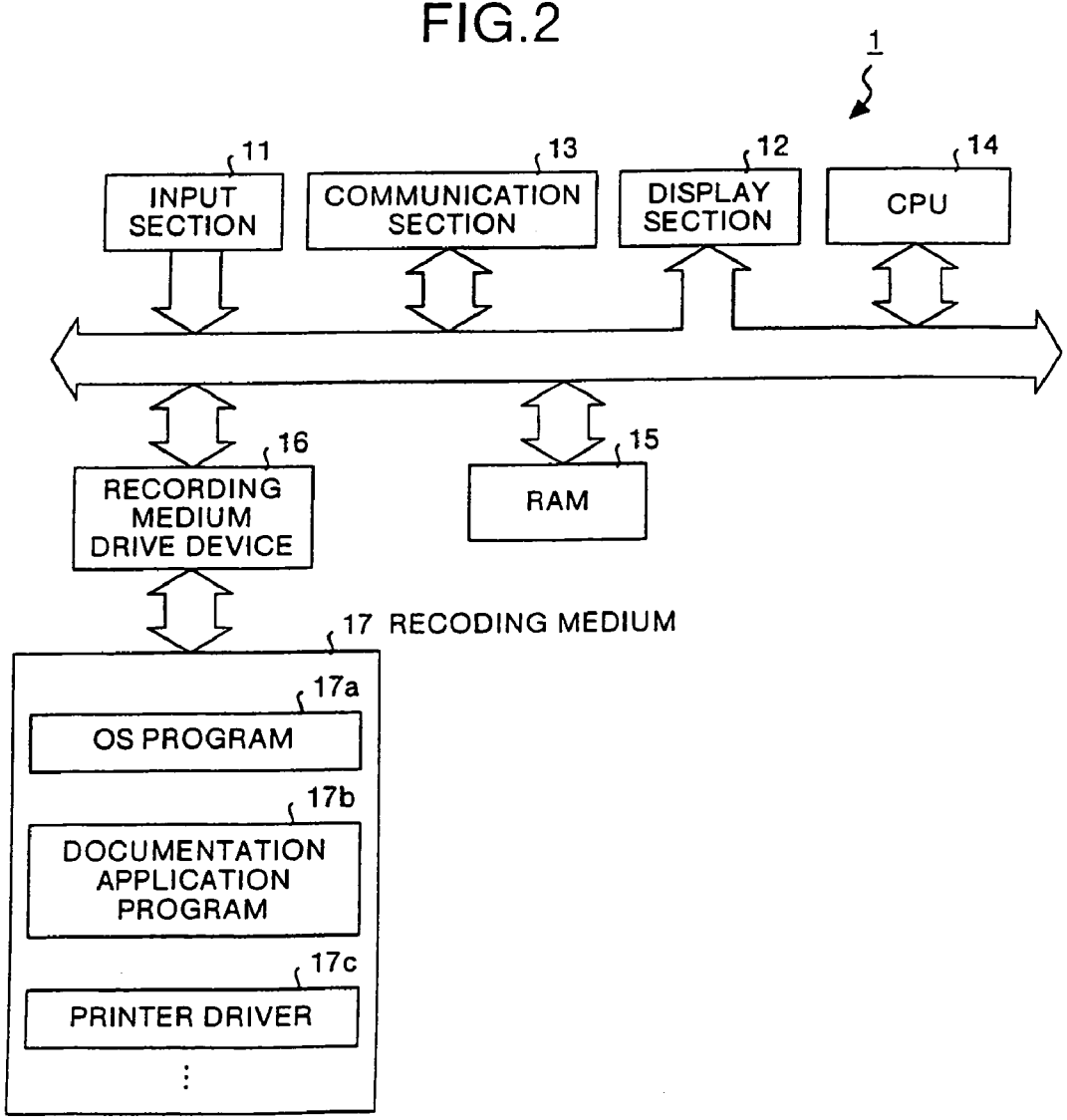

FIG.4

| | PRINTING CONDITION | FILE NAME | IMAGE DATA |
|---|---|---|---|
| DOCUMENT BASE IMAGE | DOCUMENT: LENGTHWISE<br>PRINTING PAPER: LENGTHWISE | I1MP.bmp | |
| | DOCUMENT: SIDEWISE<br>PRINTING PAPER: SIDEWISE | I1ML.bmp | |
| | AGGREGATION, PRINTING TWO PAGES→ONE PAGE<br>DOCUMENT: LENGTHWISE<br>PRINTING PAPER: SIDEWISE | I2MP.bmp | |
| | AGGREGATION, PRINTING TWO PAGES→ONE PAGE<br>DOCUMENT: SIDEWISE<br>PRINTING PAPER: LENGTHWISE | I2ML.bmp | |
| | ⋮ | | |
| AGGREGATED PARTITION LINE | PARTITION LINE FOR PRINTING TWO PAGES IN ONE PAGE<br>DOCUMENT: LENGTHWISE<br>PRINTING PAPER: SIDEWISE | ILin2P.bmp | |
| | PARTITION LINE FOR PRINTING TWO PAGES IN ONE PAGE<br>DOCUMENT: SIDEWISE<br>PRINTING PAPER: LENGTHWISE | ILin2L.bmp | ------ |
| | ⋮ | | |
| ARROWS INDICATING AGGREGATED PRINTING ORDER | AGGREGATED PRINTING ORDER FOR PRINTING TWO PAGES IN ONE PAGE LEFT→RIGHT<br>DOCUMENT: LENGTHWISE<br>PRINTING PAPER: SIDEWISE | IArr2AP.bmp | 1 →<br>2 |
| | AGGREGATED PRINTING ORDER FOR PRINTING TWO PAGES IN ONE PAGE RIGHT→LEFT<br>DOCUMENT: LENGTHWISE<br>PRINTING PAPER: SIDEWISE | IArr2BP.bmp | 2 →<br>1 |
| | AGGREGATED PRINTING ORDER FOR PRINTING TWO PAGES IN ONE PAGE TOP→BOTTOM<br>DOCUMENT: LENGTHWISE PRINTING PAPER: SIDEWISE | IArr2AL.bmp | 1<br>↓<br>2 |
| | ⋮ | | |
| DOUBLE FACE | DOUBLE FACE/LEFT SIDE BINDING<br>PRINTING PAPER: LENGTHWISE | IDupLP.bmp | |
| | DOUBLE FACE/RIGHT SIDE BINDING<br>PRINTING PAPER: LENGTHWISE | IDupRP.bmp | |
| | DOUBLE FACE/UPPER SIDE BINDING<br>PRINTING PAPER: LENGTHWISE | IDupTP.bmp | |
| | ⋮ | | |

FIG.5

| | PRINTING CONDITION | FILE NAME | IMAGE DATA |
|---|---|---|---|
| BINDING | BINDING/MINI-BOOK, LEFT OPENING DOCUMENT: LENGTHWISE, PRINTING PAPER: SIDEWISE | IBookALMP.bmp | 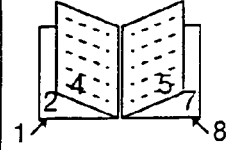 |
| | BINDING/MINI-BOOK DOCUMENT: SIDEWISE, PRINTING PAPER: LENGTHWISE | IBookAML.bmp | 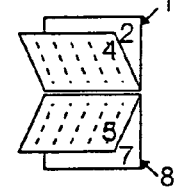 |
| | ⋮ | | |
| STAPLES | STAPLE/OBLIQUE, ONE, LEFT PRINTING PAPER: LENGTHWISE | IStp1SLP.bmp | / |
| | STAPLE/TWO, LEFT PRINTING PAPER: LENGTHWISE | IStp2LP.bmp | \|<br>\| |
| | STAPLE/TWO, RIGHT PRINTING PAPER: LENGTHWISE | IStp2RP.bmp | \|<br>\| |
| | STAPLE/ONE, UPPER LEFT (DIRECTION UNCERTAIN) PRINTING PAPER: LENGTHWISE | IStp1_LP.bmp | * |
| | STAPLE/ONE, UPPER RIGHT (DIRECTION UNCERTAIN) PRINTING PAPER: LENGTHWISE | IStp1_RP.bmp | * |
| | ⋮ | | |
| PUNCH | PUNCH/TWO, LEFT PRINTING PAPER: LENGTHWISE | PunLP.bmp | o<br>o |
| | PUNCH/TWO, RIGHT PRINTING PAPER: LENGTHWISE | IPunRP.bmp | o<br>o |
| | ⋮ | | |
| ⋮ | | | |

FIG. 9

PRINTER PROPERTIES

| BASIC | EDITING | FINISHING | OTHERS |

ONE-CLICK SET NAME:
NORMAL

PRINTING SIZE: A4(210×297mm)
PRINTING PAPER SIZE: SAME AS DOCUMENT SIZE

☐ AGGREGATED OR ENLARGED RAPID SHOOTING : FROM LEFT TO RIGHT
AGGREGATE TWO PAGES INTO ONE PAGE        ☑ PARTITION LINE

☐ DOUBLE FACE/BINDING DOUBLE FACE : OPEN TO THE LEFT

☐ STAMP
CONFIDENTIAL
ADD IMAGE STAMP...
EDIT...          DELETION...
ADD CHARACTER STAMP...

☐ BINDING MARGIN        :LEFT:0.0mm
DETAILS OF BINDING MARGIN...
RETURN TO STANDARD

STORE WITH A NAME...        CANCEL        HELP

INFORMATION PROCESSING DEVICE, PRINTING CONDITION SETTING METHOD, AND COMPUTER PRODUCT IN WHICH A GRAPHICAL REPRESENTATION EMULATING A PRINT OUTPUT IS DISPLAYED

CROSS-REFERENCE TO RELATED APPLICATIONS

This application is a continuation of and claims the benefit of priority under 35 USC §120 from U.S. Ser. No. 09/988,140 filed Nov. 19, 2001 now abandoned and claims the benefit of priority under 35 U.S.C. §119 from Japanese Patent Application No. 2000-376718 filed Dec. 11, 2000, the entire contents of each which are incorporated herein by reference.

FIELD OF THE INVENTION

The present invention relates to an information processing device, a printing condition setting method, and a computer program for executing the method. More specifically, this invention relates to an information processing device and a printing condition setting method, capable of preparing icons for symbolizing a plurality of printing conditions, and selecting the prepared icon to set a plurality of printing conditions, and a computer program for executing the method.

BACKGROUND OF THE INVENTION

Recently, with an increase and upgrade of printer functions, printer setting is becoming complicated and difficult for users. Specifically, it becomes complicated and difficult for users to set printing conditions on a printer driver screen. This printer driver is a software program designed such that with respect to a specific program, other programs can be operated without worrying about the hardware and internal "language" of the printer, and designed for controlling the printer and for performing processing of output data or the like. When a different printer is used, the codes and commands necessary for correctly operating the printer and for using respective special functions and abilities are also different. The application programs can precisely correspond to various printers, by using a printer driver which handles all the delicately different functions of respective printers on behalf of the application programs. In the Windows 95/98 or Mac OS, the printer driver is controlled by the OS.

SUMMARY OF THE INVENTION

It is an object of the present invention to provide an information processing device and a printing condition setting method, capable of easily setting printing functions of a printer, when the printing data is printed by a printer, and a computer program for executing the method.

In the information processing device according to one aspect of this invention, printing functions can be on a display screen displayed in a display unit when printing data is printed using a printer. This information processing device comprises: a symbol display control unit which displays a list of symbols, each representing a plurality of printing functions, in a symbol display area on the display screen; a symbol selection unit which selects one symbol from the list of symbols displayed in the symbol display area; and a printing function setting unit which sets a plurality of printing functions represented by the symbol selected by the symbol selection unit.

The printing condition setting method according to another aspect of this invention is a method of setting printing functions on a display screen displayed in a display unit when printing data is printed using a printer. This method comprises: a first display step of displaying a list of symbols, each representing a plurality of printing functions, in a symbol display area on the display screen; a selection step of selecting one symbol from the list of symbols displayed in the symbol display area; and a printing function setting step of setting a plurality of printing functions represented by the symbol selected by the symbol selection unit.

The computer program according to still another aspect of this invention, which when executed on a computer realizes the method according to the present invention.

Other objects and features of this invention will become apparent from the following description with reference to the accompanying drawings.

BRIEF DESCRIPTION OF THE DRAWINGS

FIG. 1 is a diagram showing a schematic construction of a printer system according to one embodiment;

FIG. 2 is a block diagram showing the construction of a personal computer shown in FIG. 1;

FIG. 4 is a diagram (1) for explaining the correspondence of printing conditions, the image data file indicating the printing conditions, and the image data;

FIG. 5 is a diagram (2) for explaining the correspondence of printing conditions, the image data file indicating the printing conditions, and the image data;

FIG. 9 is a diagram showing an editing condition setting screen of the one-click icon;

DETAILED DESCRIPTION

Figure 3:
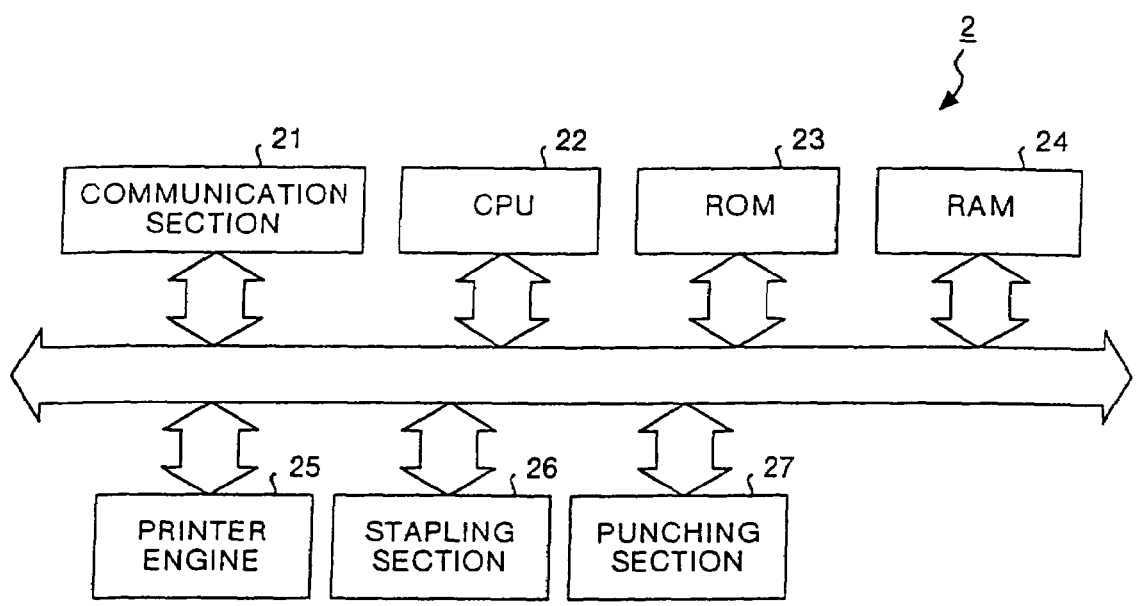
FIG. 3 is a block diagram showing the construction of a printer shown in FIG. 1.

An embodiment of the information processing device and the printing condition setting method according to the present invention will now be described in detail, with reference to the drawings. In this specification, "printing condition" and "printing function" are used as an equivalent word. Also, the term "symbol" is used as a term having a wide concept including images such as icon or the like.

FIG. 1 is a diagram showing a schematic construction of a print system according to this embodiment. The print system shown in FIG. 1 is constructed such that a personal computer 1 for transmitting a printing job including the printing data and printing conditions for printing the printing data, and a printer 2 for printing the printing data are connected via a cable 3.

The personal computer 1 transmits the printing data corresponding to a prepared document and the printing condition data set for printing this document (paper direction, reversing, aggregation, binding, stapling, punching and scaling), as the printing job, to the printer 2.

The printer 2 performs printing of the printing data, in accordance with the printing job transmitted from the personal computer 2. Specifically, the printer 4 prints the printing data included in the printing job on a media such as paper, in accordance with the printing condition data (paper direction, reversing, aggregation, binding, stapling, punching and scaling) included in the printing job.

Specific construction of the personal computer 1 and the printer 2 will be described below sequentially.

FIG. 2 is a block diagram showing the schematic construction of the personal computer 1 shown in FIG. 1. In FIG. 2, the personal computer 1 comprises an input section 11 for inputting data, a display unit 12, a communication section 13 for performing data communication, a CPU 14 in charge of the whole control of the apparatus, a RAM 15 used as a work area of the CPU 14, a recording medium access apparatus 16 for performing read and write from/to a recording medium 17, and the recording medium 17 storing various programs for operating the CPU 14.

The input section 11 comprises a keyboard comprising cursor movement key(s), number input key(s) and various function keys, and a mouse and a slice pad for selecting keys on the display screen of the display unit 12, which is a user interface for an operator to give operation instructions to the CPU 14 and to input data.

The display unit 12 comprises a CRT, a LCD or the like, for performing display corresponding to the display data input from the CPU 12. The communication section 13 is for performing data communication with the external equipment, and for example, for performing data communication with the printer 2 or the like via the cable 3.

The CPU 14 is a central control unit which controls the whole apparatus according to a program stored in the recording medium 17. To this CPU 14 are connected the input section 11, the display unit 12, the communication section 13, the RAM 15 and the recording medium access apparatus 16, for controlling the data communication, readout of the application program by the access to the memory, read and write of various data, data/command input, display or the like. The CPU 14 also transmits the printing data input from the input section 11 and the printing condition data of the printing data as the printing job to the printer 2, via the communication section 13.

The RAM 15 comprises a work memory for storing the specified program, input instructions, input data and processing results, and a display memory for temporarily storing the display data to be displayed on the display screen in the display unit 12.

The recording medium 17 stores an OS program 17a executable by the CPU 14 (for example, WINDOWS 95, WINDOWS 98, etc.), a documentation application program 17b, and various programs and data such as a printer driver 17c corresponding to the printer 1. The recording medium 17 is an optical, magnetic or electric recording medium, for example, a floppy disk, a hard disk, a CD-ROM, a DVD-ROM, a MO, a PC card or the like. The various programs are stored in the recording medium 17 in the data format readable by the CPU 14. Moreover, in some cases, the various programs are recorded beforehand in a recording medium, or are downloaded via a communication line and stored in a recording medium. The various programs can be distributed via the communication line.

FIG. 3 is a block diagram showing the schematic construction of the printer 2 shown in FIG. 1. In FIG. 3, the printer 2 comprises a communication section 21 for performing data communication, a CPU 22 in charge of the whole control of the printer 2, a ROM 23 for storing various control programs for operating the CPU 22, a RAM 24 being a work area of various control programs, and temporarily storing printing data of the printing job input from the personal computer 1 or the like and the printing condition data, a printer engine 25 for printing the printing data on a transfer paper, a stapling section 26 for stapling the paper on which the printing data is printed, and a punching section 27 for punching the transfer paper on which the printing data is printed. The printer 2 also has a reversing function, a punching function and a stapling function.

The communication section 21 is for performing data communication with the external equipment, and for example, for performing data communication with the personal computer 2 or the like.

The CPU 22 is a central control unit which controls the whole apparatus according to various control programs stored in the ROM 23. To this CPU 22 are connected the communication section 21, the ROM 23, the RAM 24, the printer engine 25, the stapling section 26 and the punching section 27, for controlling the data communication, printer operation and the like.

The ROM 23 stores various control programs for operating the CPU 21 and parameters used for the processing. The RAM 24 comprises a work memory for storing the specified control program, the processing result and the received printing data.

The printer engine 25 comprises an electrophotographic printer engine, and is a unit, which prints the printing data on the transfer paper.

The printer driver 17c of the personal computer 1 will now be described. The CPU 14 performs, in accordance with the printer driver 17c, setting of the printing conditions described later, registration of a one-click icon, transfer of the printing data prepared by the documentation application 17b to the printer 2.

The printer driver 17c has the image data indicating the respective printing conditions in a bitmap file format. The printer driver 17c stores the printing conditions associated with the image data file indicating the printing conditions. FIG. 4 and FIG. 5 are diagrams showing the correspondence of the printing conditions, the image data file indicating the printing conditions and the image data. In the printer driver 17c, as shown in FIG. 4 and FIG. 5, there are registered image data for each printing condition, such as (1) document base, (2) aggregated partition line, (3) aggregated printing order arrows, (4) stamps, (5) staple and punch, and (6) reversing.

The printer driver 17c overlaps the image data in the order of from (1) a document base, (2) an aggregated partition line, (3) an aggregated printing order arrow, (4) a stamp, (5) staple and punch, (6) reversing and (7) variable power, to thereby prepare an icon, and displays this icon on the display screen.

(1) Summary of the Registration Procedure of the One-Click Icon

Figure 6:
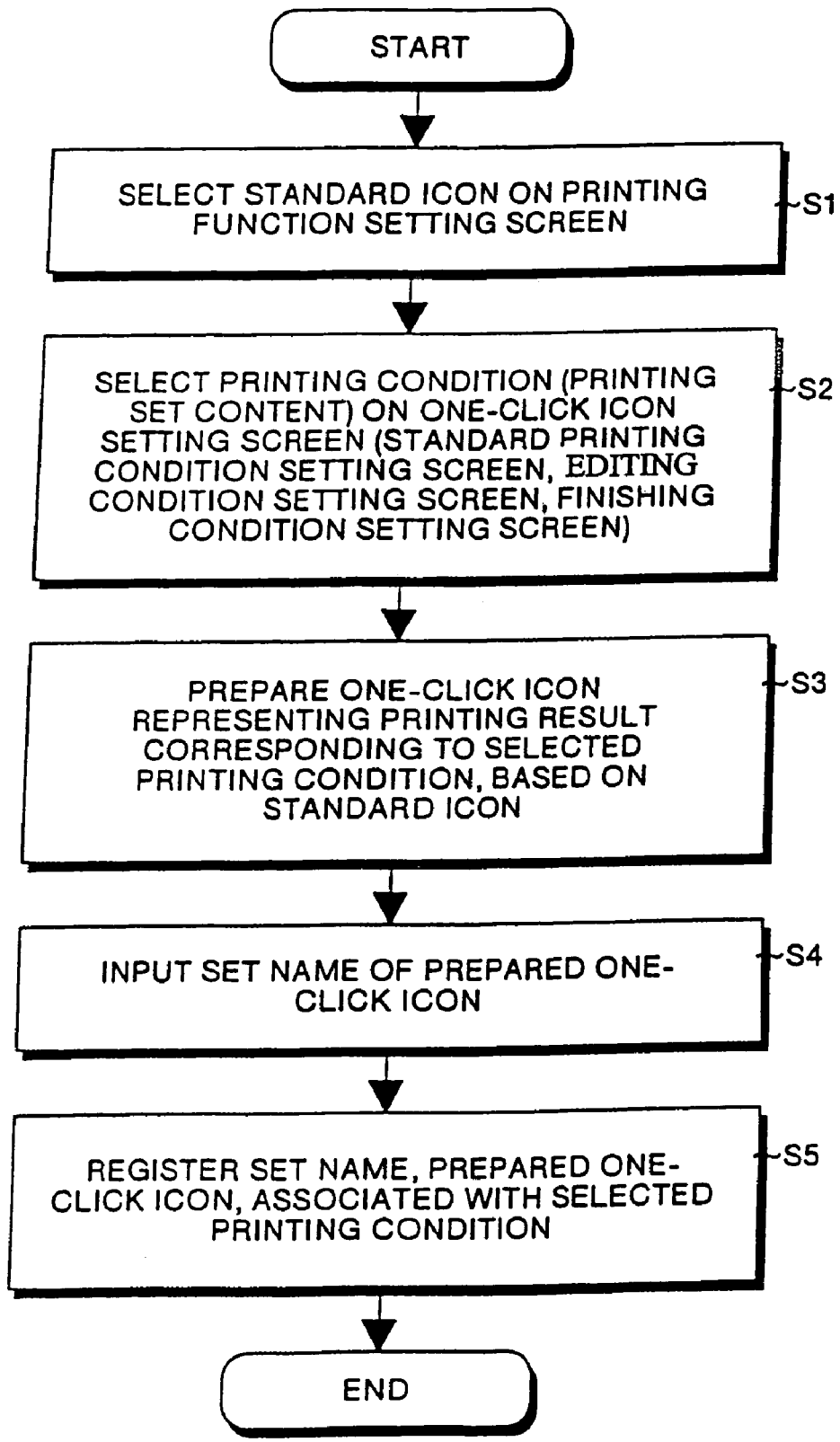
FIG. 6 is a flowchart for explaining the summary of a registration procedure of a one-click icon of a printer driver.

The summary of the registration procedure of the one-click icon by the printer driver will now be described, with reference to the flowchart in FIG. 6. FIG. 6 shows a flowchart for explaining the summary of the registration procedure of the one-click icon in the printer driver 17c.

In FIG. 6, on the printing function setting screen of the printer driver displayed in the display unit, a standard icon is selected (step S1). Then, on the one-click icon setting screen (standard printing condition setting screen, editing condition setting screen, finishing condition setting screen), a printing condition is selected (step S2), to prepare a one-click icon representing the printing result corresponding to the selected printing condition, based on the standard icon (step S3). One or more screens of the standard condition setting screen, the editing condition setting screen and the finishing condition setting screen are selected, to prepare a one-click icon representing the selection of the printing condition (paper direction, reversing, aggregation, binding, stapling, punching and scaling) and the printing result of the selected plurality of printing conditions.

Then, the set name of the prepared one-click icon and a comment are input (step S4), and the set name, the comment and the prepared one-click icon are registered on a recording medium, associated with the selected printing conditions (step S5). This registered one-click icon is displayed on the printer driver screen afterwards, and when the displayed one-click icon is selected, the printing conditions are automatically set.

(2) Display Screen of the Printer Driver

Figure 7:
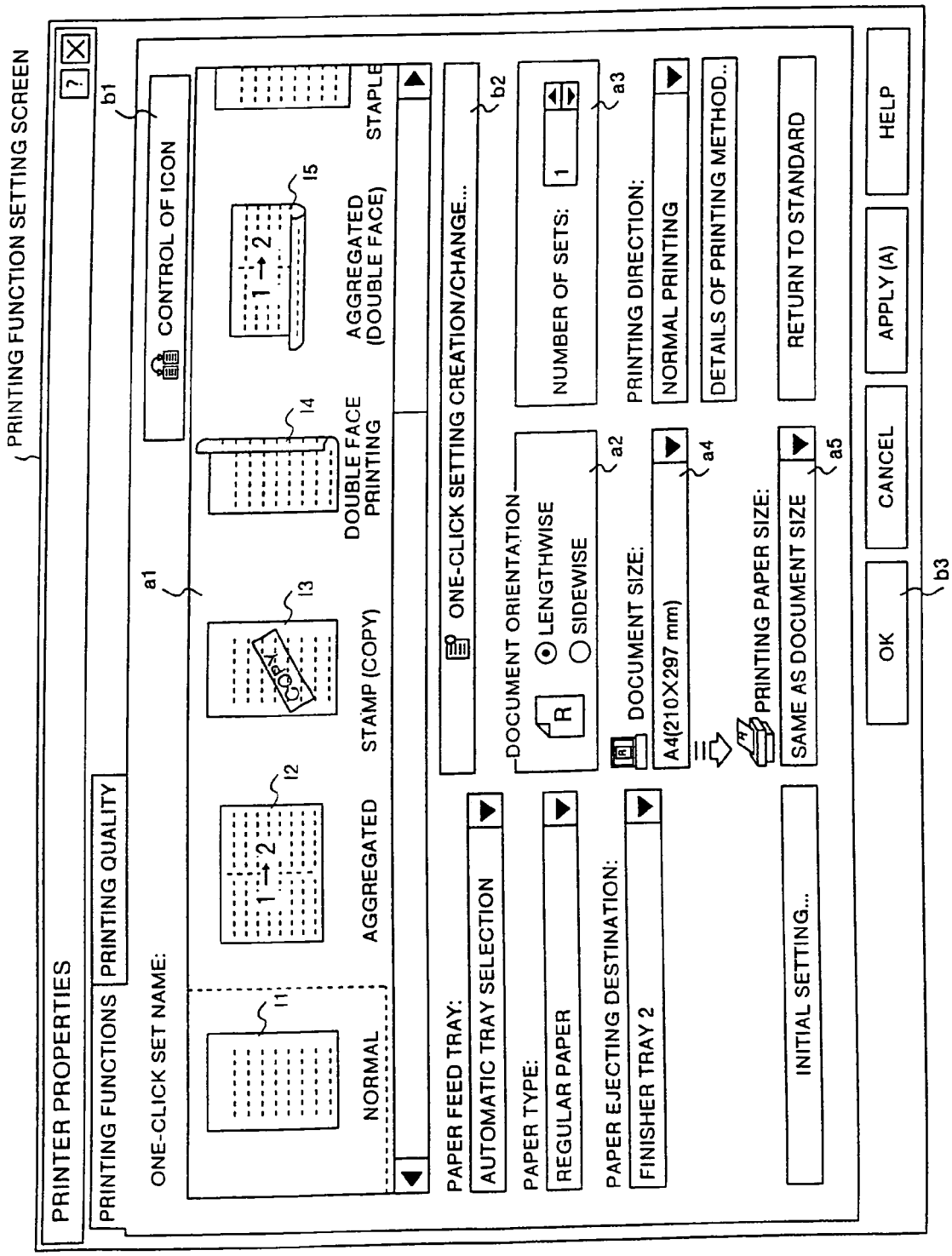
FIG. 7 is a diagram showing a printing function setting screen (1) of the printer driver.
Figure 8:
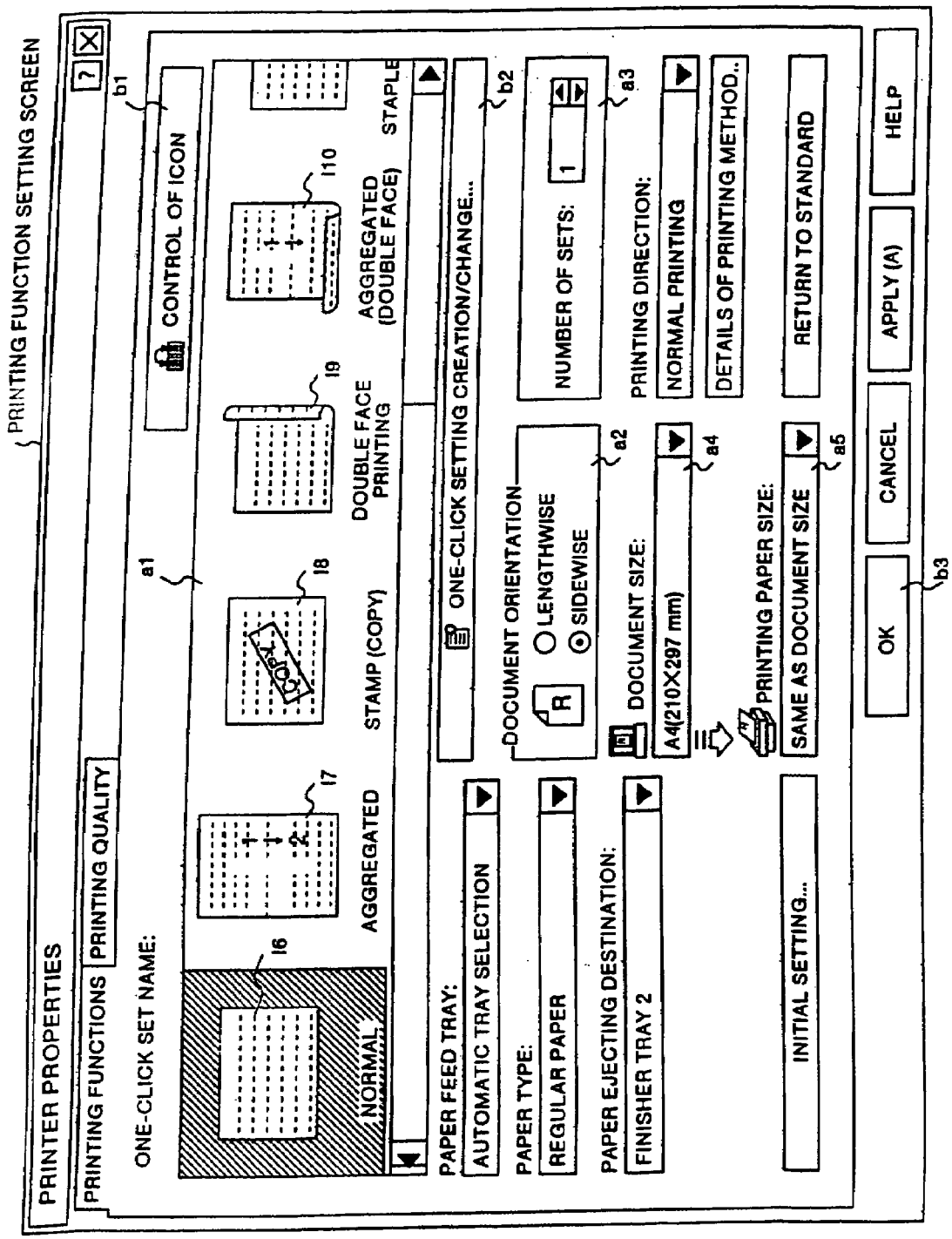
FIG. 8 is a diagram showing a printing function setting screen (2) of the printer driver.
Figure 10:
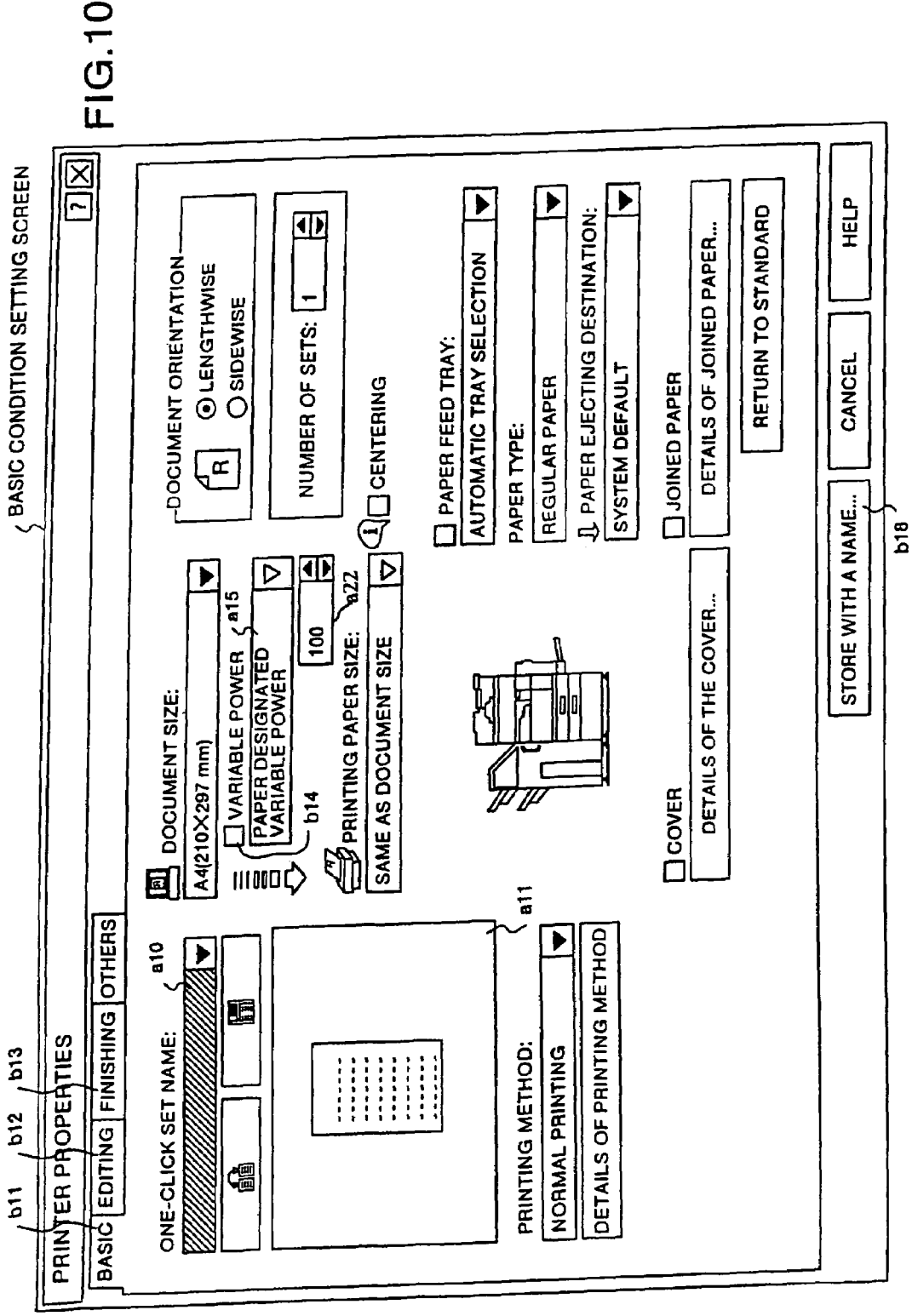
FIG. 10 is a diagram showing a basic condition setting screen of the one-click icon.
Figure 11:
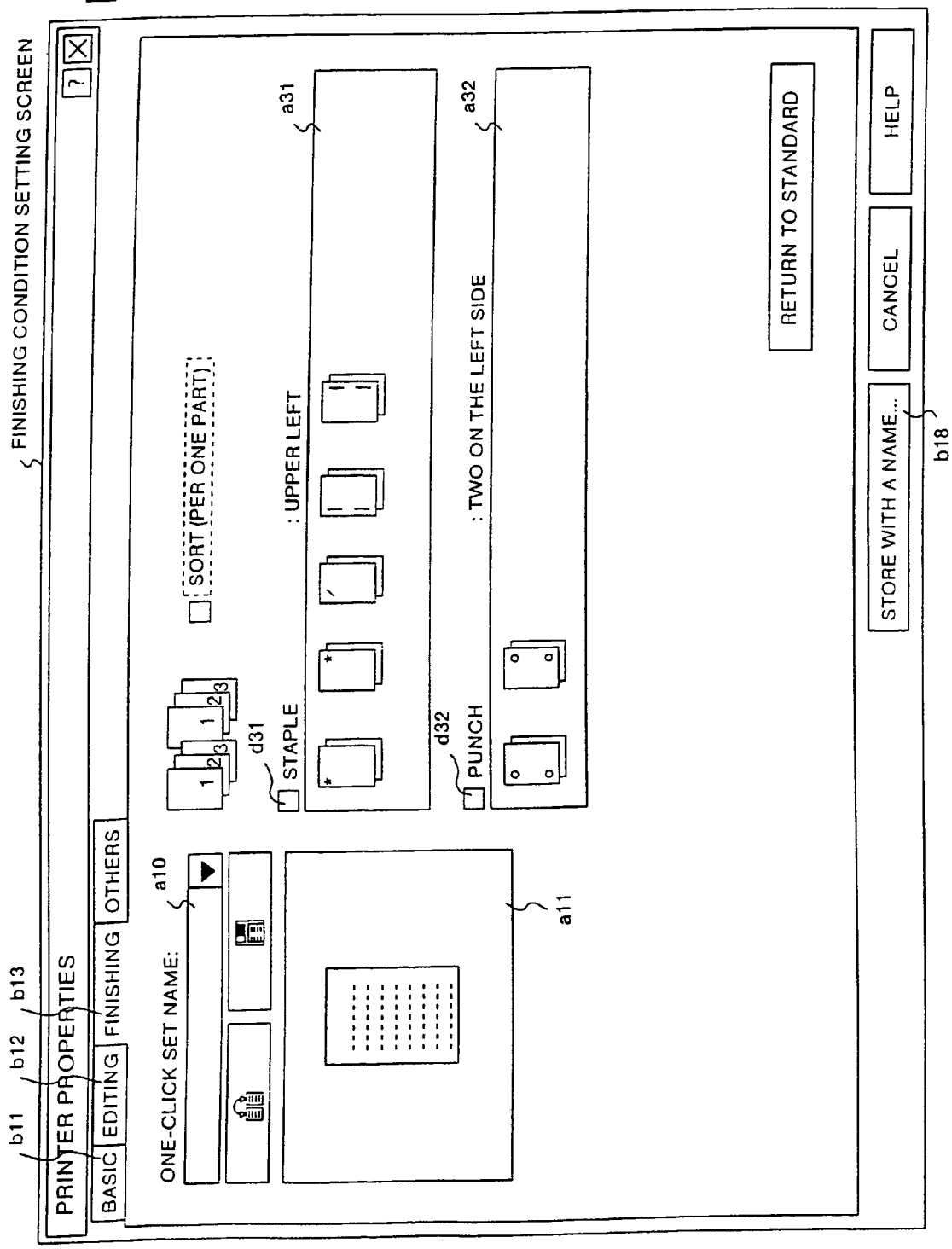
FIG. 11 is a diagram showing a finishing condition setting screen of the one-click icon.
Figure 12:
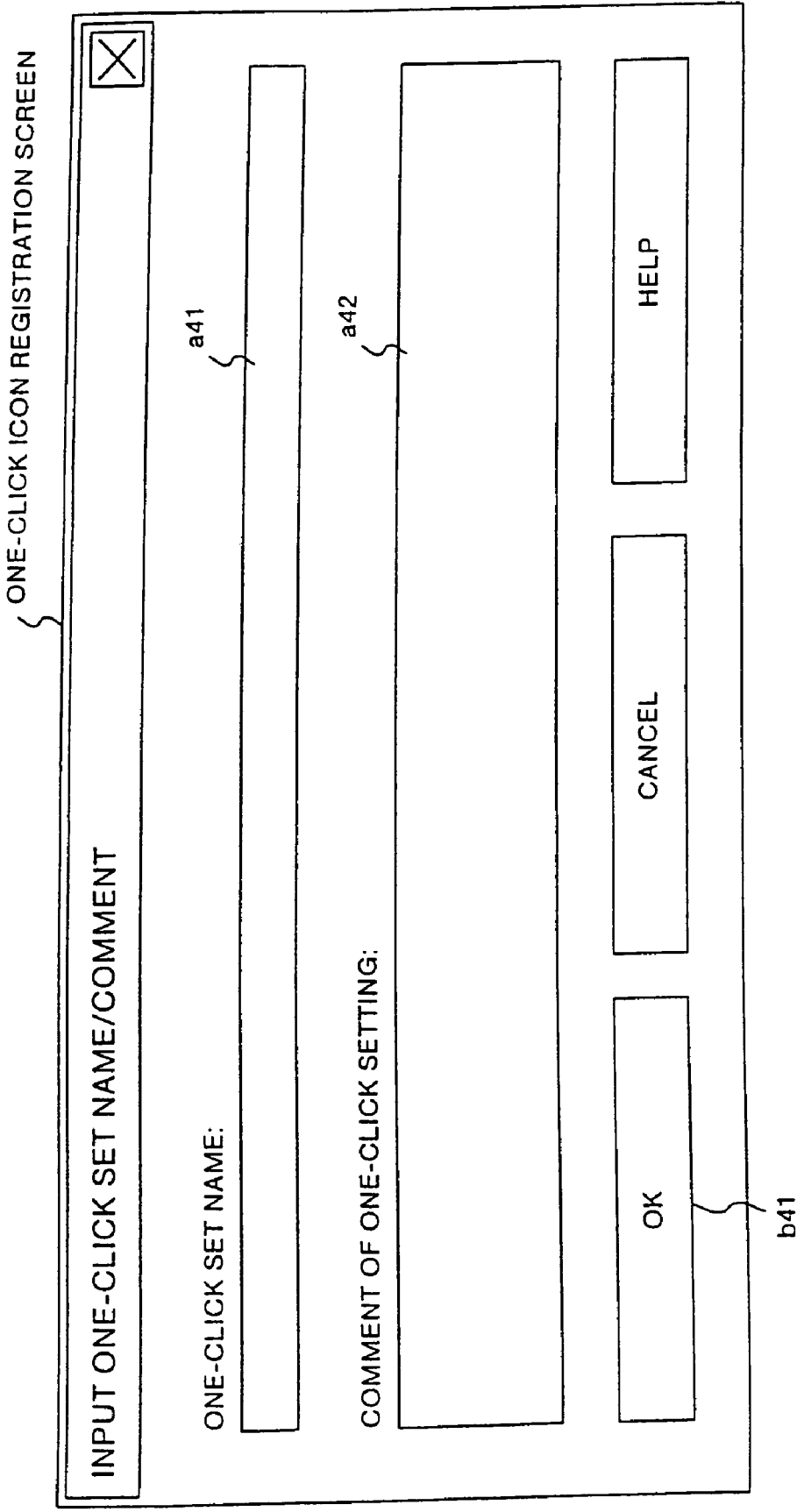
FIG. 12 is a diagram showing a one-click icon registration screen.
Figure 13:
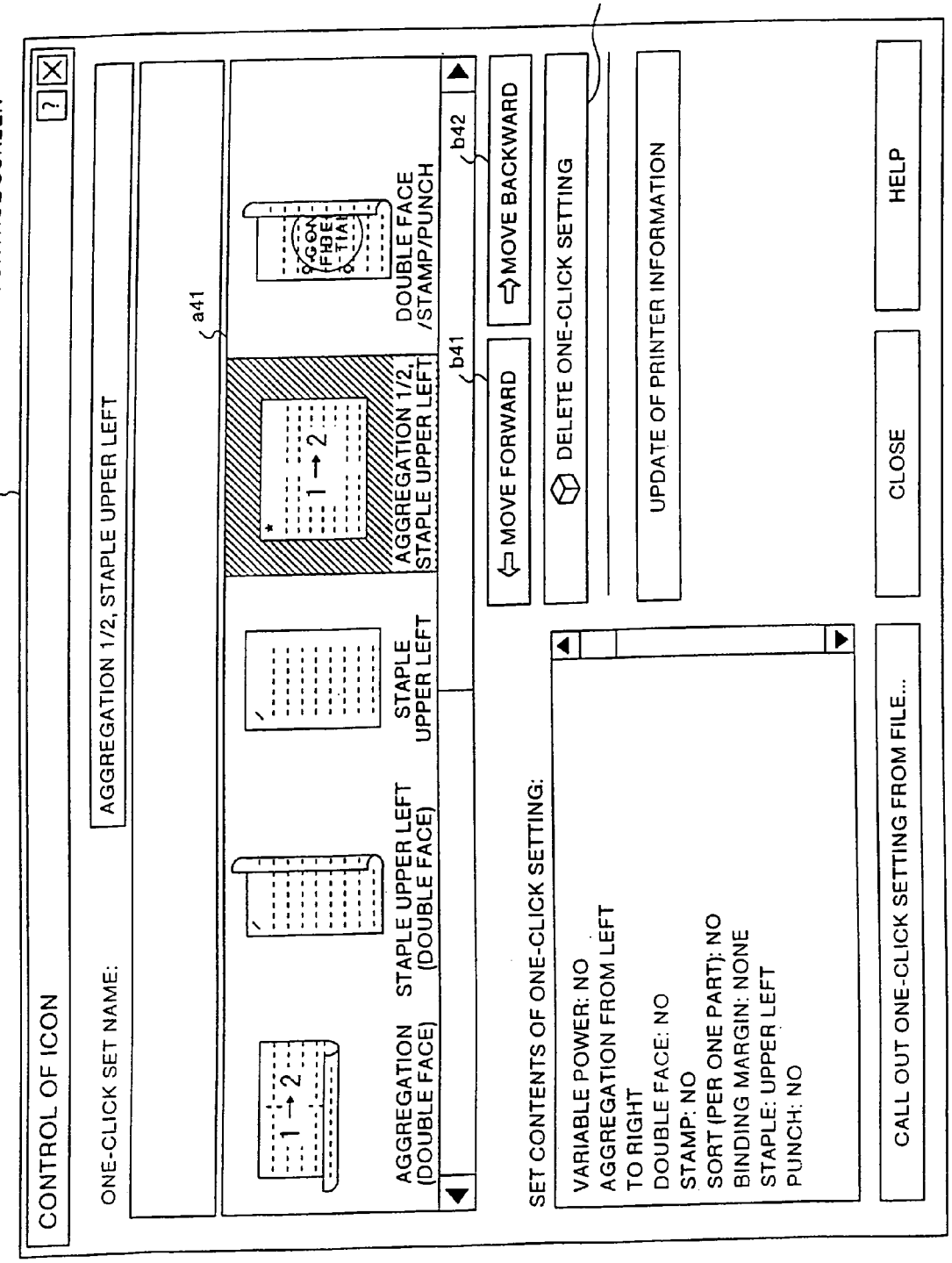
FIG. 13 is a diagram showing a one-click icon control screen.

Next, the display screen of the printer driver will be described, with reference to FIG. 7 to FIG. 13. FIGS. 7 and 8 show the printing function setting screen of the printer driver, FIG. 9 shows the editing condition setting screen of the one-click icon, FIG. 10 shows the standard condition setting screen of the one-click icon, FIG. 11 shows the finishing condition setting screen of the one-click icon, FIG. 12 shows the one-click icon registering screen, and FIG. 13 shows the one-click icon control screen.

The printing function setting screen of the printer driver 17c shown in FIG. 7 is a display screen of the documentation application and a start-up screen of the OS, and is a screen displayed when start-up of the printer driver 17c is selected.

In the printing function setting screen shown in this figure, reference numeral a1 denotes an icon display area where the registered one-click icons are displayed in a list. The icons displayed in the icon display area a1 are overlapped with the image data (see FIG. 4 and FIG. 5) stored in the recording medium 17 and displayed. In the icon display area a1, there are displayed an icon I1 of lengthwise document, an icon I2 of lengthwise document, aggregation 1/2 (printing order: from left to right) and having a partition line, an icon I3 of a stamp (COPY) with document lengthwise, an icon I4 of lengthwise document and double face printing, and an icon I5 of lengthwise document, aggregation 1/2 (printing order: from left to right), having a partition line and double face printing. In this icon display area a1, a standard icon when preparing the one-click icon is selected.

How, for example, the icon I2 is prepared will be described. The icon I2 indicates such printing contents that the document is lengthwise, aggregation is 1/2 (two documents are printed in one sheet of paper), and the document is printed from left to right with a partition line. This icon I2 is prepared by overlapping (1) the document base (the image data of 12MP.bmp in FIG. 4), (2) an aggregated partition line (the image data of ILin2P.bmp in FIG. 4), and (3) aggregated printing order arrow (the image data of IArr2AP.bmp in FIG. 4) in order.

Reference numeral a2 indicates the document orientation selection area for selecting the orientation of the document. In the document orientation selection area a2, "lengthwise" or "sidewise" of the document is selected. In accordance with this selection of "lengthwise" or "sidewise" of the document, the document is changed over to be lengthwise or sidewise. The display example of the icon display area a1 in FIG. 7 shows a case where "lengthwise" is selected in the document orientation selection area a2. When "sidewise" is selected in the document orientation selection area a2, the display example of the icon display area a1 is changed over to the icon in the sidewise direction, as shown in FIG. 8. In the icon display area a1, there are displayed an icon I6 of sidewise document, an icon I7 of sidewise document, aggregation 1/2 (printing order: from left to right) and having a partition line, an icon I8 of a stamp (COPY) with document sidewise, an icon I9 of sidewise document and double face printing, and an icon I10 of sidewise document, aggregation 1/2 (printing order: from left to right), having a partition line and double face printing.

Also in FIG. 7, reference numeral a3 denotes the number of sets-selection area for selecting the number of sets, a4 denotes the document size selection area for selecting the document size, and a5 denotes the printing paper size selection area for selecting the printing paper size.

Reference numeral b1 denotes an icon control key for selecting the display of the icon control screen, b2 denotes a one-click setting creation/change key for displaying the screen for registering the one-click icon, and b3 denotes a OK key for selecting the execution instruction of printing.

In this printing function setting screen in FIG. 7, after the standard icon has been selected from the icons displayed in the icon display area a1, when the one-click setting creation/change key b2 is selected, the editing condition setting screen of the one-click icon is displayed.

Next, the editing condition setting screen of the one-click icon will be described with reference to FIG. 9. In the editing condition setting screen shown in this figure, b11 denotes a basic key for selecting the display of the basic condition selecting screen (see FIG. 10), b12 denotes an edit key for selecting the display of the editing condition selecting screen (see FIG. 9), and b13 denotes a finishing key for selecting the display of the finishing condition selecting screen (see FIG. 11).

Reference numeral a10 denotes an icon set name display area where the set name of the icon selected in the icon display area a1 is displayed, all denotes a one-click icon display area for displaying the one-click icon corresponding to the selected printing function, d10 denotes a radio button for selecting aggregated or enlarged rapid shooting, a12 denotes an aggregated or enlarged rapid shooting type selection area for selecting the type of aggregated or enlarged rapid shooting, a13 denotes an aggregated or enlarged rapid shooting parts icon display area for displaying a list of icons (parts) corresponding to the type selected in the aggregated or enlarged rapid shooting type selection area a12.

Reference numeral d11 denotes a radio button for selecting reversing and binding, a14 denotes a reversing/binding parts icon display area for displaying the icon (parts) of the printing conditions of reversing and binding. Reference numeral d14 denotes a radio button for selecting a partition line, d13 denotes a radio button for selecting a binding margin, d12 denotes a radio button for selecting a stamp, and a15 denotes a stamp type selection area for selecting the type of stamps. In the stamp display type selection area a15, items such as "draft", "confidential" or "externally confidential" can be selected. Reference numeral b18 denotes a store with a name key for selecting the display of the registration screen for registering the one-click icon.

In the one-click icon display area all, the printing function (icon) selected in the aggregated or enlarged rapid shooting type selection area a13, the printing function (icon) selected in the reversing/binding parts icon display area a14, and the one-click icon corresponding to the stamp selected in the stamp type selection area a15 are combined and displayed.

The basic condition setting screen of the one-click icon will now be described with reference to FIG. 10. In the basic condition setting screen shown in this figure, reference numeral b11 denotes a basic key for selecting the display of the basic condition selecting screen (see FIG. 10), b12 denotes an edit key for selecting the display of the editing condition selecting screen (see FIG. 9), and b13 denotes a finishing key for selecting the display of the finishing condition selecting screen (see FIG. 11).

Reference numeral a10 denotes an icon set name display area where the set name of the icon selected in the icon display area a1 is displayed, all denotes a one-click icon display area for displaying the one-click icon corresponding to the selected printing function, b14 designates a radio button for selecting variable power, a15 denotes a variable power designation area for selecting the type of variable power (paper designated variable power, zoom, independent variable power), a22 denotes a magnification selection area for selecting the magnification. Reference numeral b18 denotes a store with a name key for selecting the display of the registration screen for registering the one-click icon.

In the one-click icon display area all, the one-click icons corresponding to the printing functions selected in the variable power designation area a15 are combined and displayed.

FIG. 11 shows a display example of the finishing condition setting screen for setting the finishing printing condition of the one-click icon. In the finishing condition setting screen shown in this figure, reference numeral b11 denotes a basic key for selecting the display of the basic condition selecting screen (see FIG. 10), b12 denotes an edit key for selecting the display of the editing condition selecting screen, and b13 denotes a finishing key for selecting the display of the finishing condition selecting screen (see FIG. 11).

Reference numeral a10 denotes an icon set name display area where the set name of the icon selected in the icon display area a1 is displayed, all denotes a one-click icon display area for displaying the one-click icon corresponding to the selected printing function, d31 denotes a radio button for selecting a staple, a31 denotes a staple (parts) icon display area for displaying a list of icons (parts) indicating various stapling functions, d32 denotes a radio button for selecting punch, and a32 denotes a punch (parts) icon display area for displaying an icon (parts) indicating various punching functions. Reference numeral b18 denotes a store with a name key for selecting the display of the registration screen for registering the one-click icon.

In the one-click icon display area all, one-click icons corresponding to the printing function selected in the staple display area a21 and the printing function selected in the punch display area a4 are combined and displayed.

FIG. 12 shows a display example of the displayed one-click registration screen, in the case where the store with a name key is selected, in the screens shown in FIG. 9 and FIG. 11. In the one-click registration screen in this figure, reference numeral a41 denotes a one-click set name input area for inputting the set name of the one-click icon, a42 denotes a comment input area of one-click setting for inputting a comment related to the one-click icon, and b41 denotes an OK key for registering the one-click icon.

In the one-click set name input area a41, a one-click set name is input, and a comment related to the one-click icon is input in the comment input area of one-click setting. Thereafter, when the OK key is selected, the set name, the comment and the prepared one-click icon are registered in the recording medium 17 associated with the selected printing condition.

FIG. 13 shows one example of the icon control screen displayed, in the case where the icon control key b1 is selected in the printing function selecting screen in FIG. 7. In the printing function selecting screen, reference numeral a41 denotes an icon display area where the registered one-click icons are displayed in a list, b41 denotes a move forward key for moving the icon selected in the icon display area a41 forward, b42 denotes a move backward key for moving the icon selected in the icon display area a41 backward, and b43 denotes a delete one-click setting key for deleting the icon selected in the icon display area a41.

When the icon is selected in the icon display area a41, and the move forward key b41 is pushed once, the selected icon is replaced with the one displayed on the left side in the order of display, and moved one ahead. When the move backward key b42 is pushed once, the selected icon is replaced with the one displayed on the right side in the order of display, and moved one behind. Moreover, when the icon is selected in the icon display area a41, and the delete one-click setting key b43 is selected, the one-click setting of the selected icon is deleted.

(3) Specific Example of Registration Procedure of One-Click Icon

Next, a specific example of registration procedure of the one-click icon will be described, with reference to FIG. 14 to FIG. 21. FIG. 14 to FIG. 21 are diagrams showing a display example of the printer driver screen for explaining a specific example of registration procedure of the one-click icon. As one example, a specific procedure for preparing a one-click icon representing function of aggregation 1/2 (with a partition line) and upper left staples will be described with reference to FIG. 14 to FIG. 17.

At first, the "icon I1 (set name: normal)" is selected as a standard icon from icons displayed in the icon display area a1 on the printing function setting screen shown in FIG. 7, and the orientation "lengthwise" is selected in the document orientation selection area a2. Then, when the one-click setting creation/change key b2 is selected, the editing condition setting screen shown in FIG. 9 is displayed.

In the editing condition setting screen shown in FIG. 9, the set name "normal" selected in the icon display area a1 on the printing function setting screen shown in FIG. 7 is displayed in the one-click icon set name display area a2. In the one-click icon display area a11, the "icon I1 (set name: normal)" selected in the icon display area a1 in FIG. 7 is displayed.

Figure 14:
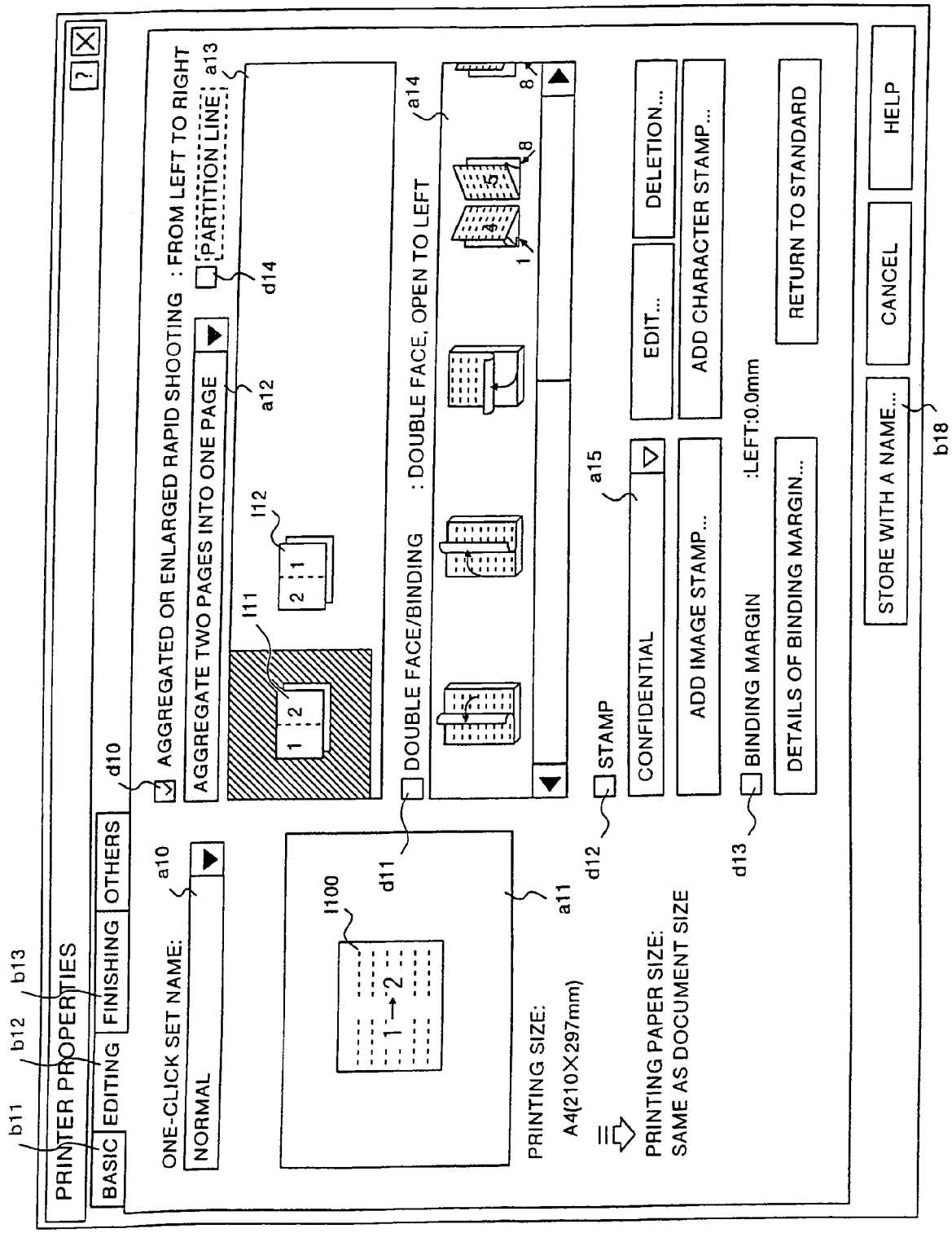
FIG. 14 is a diagram showing a display example of a display screen for specifically explaining the registration procedure of the one-click icon.

As shown in FIG. 14, when the radio button d10 for selecting aggregated or enlarged rapid shooting is selected, and "aggregate two pages into one page" is selected in the aggregated or enlarged rapid shooting type selection area a12, then in the aggregated or enlarged rapid shooting parts icon display area a13, icons I11 and I12 indicating the printing result for aggregating two pages into one page are displayed. The icon I11 denotes the printing result for aggregating two pages into one page from left to right, and the icon I12 denotes the printing result for aggregating two pages into one page from right to left. In the aggregated or enlarged rapid shooting parts icon display area a13, when the icon I11 is selected, the icon I100 indicating the printing result for aggregating two pages into one page from left to right is displayed in the one-click icon display area a3. This is obtained by overwriting image data of an arrow on the image data of the document base.

Figure 15:
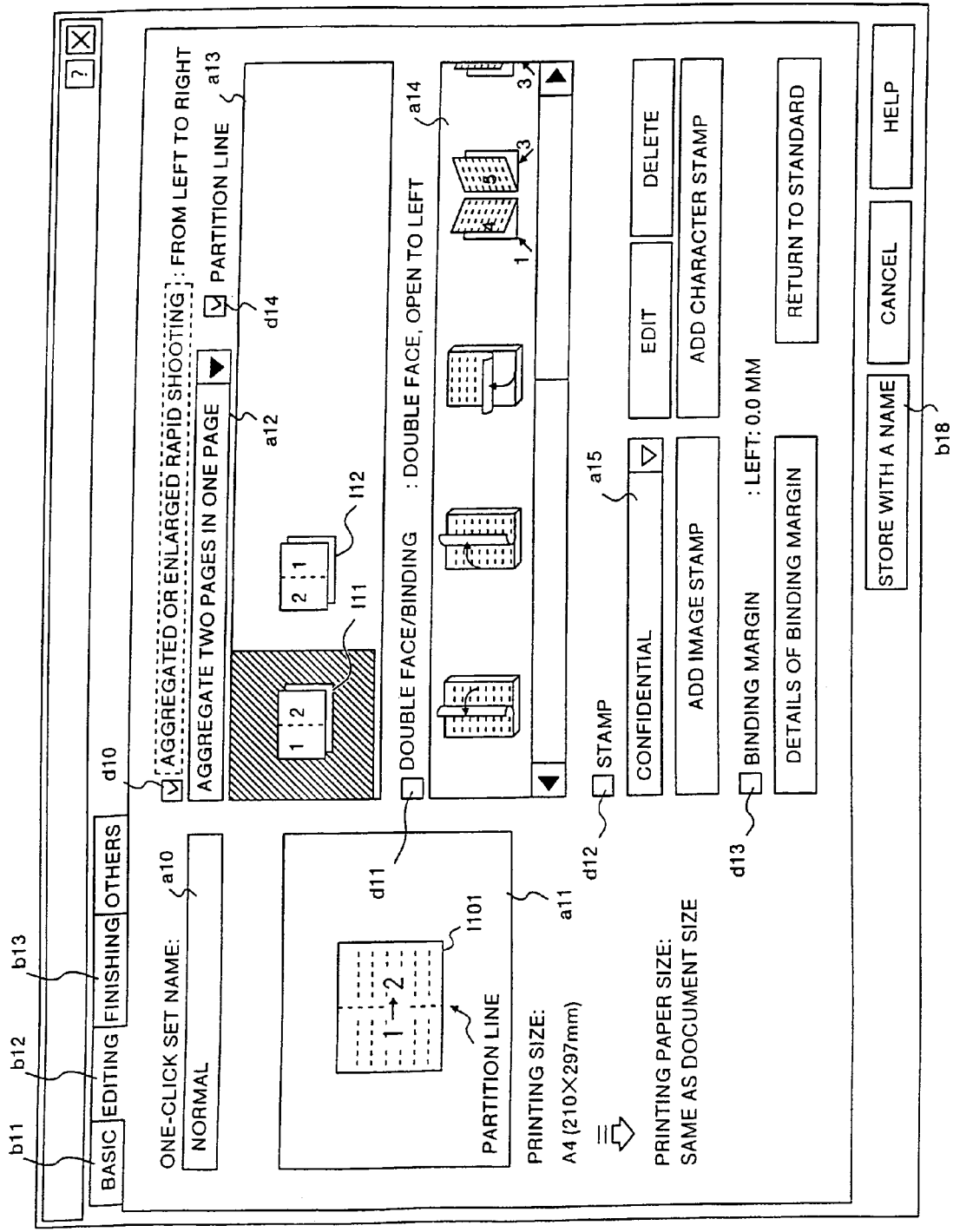
FIG. 15 is a diagram showing a display example of a display screen for specifically explaining the registration procedure of the one-click icon.

Subsequently, as shown in FIG. 15, when the radio button d14 for selecting a partition line is selected, an icon I101 in which a partition line is drawn in the icon I100 (see FIG. 14) is displayed in the one-click icon display area a3. This is obtained by overwriting image data of a partition line on the icon I101 (see FIG. 14).

Figure 16:
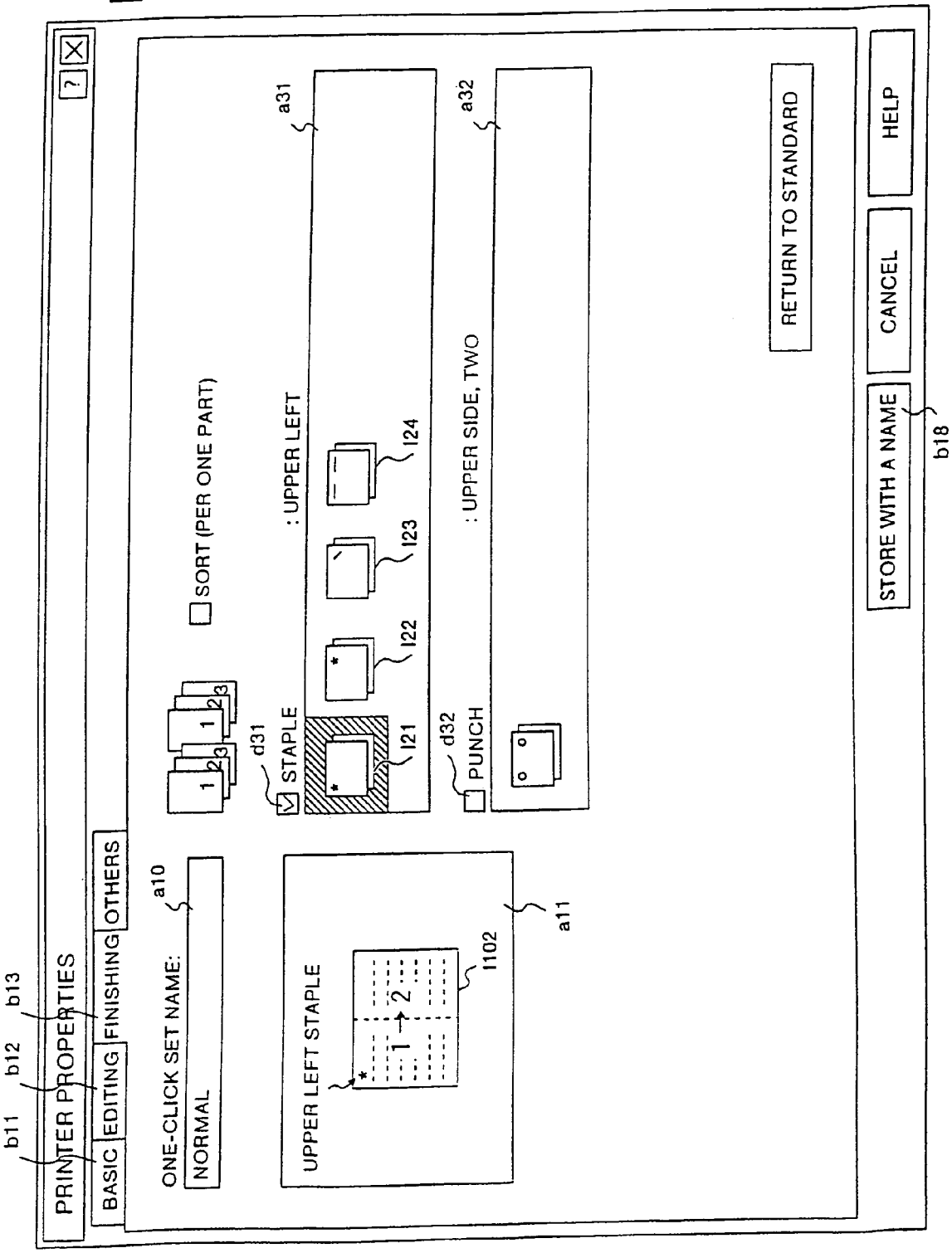
FIG. 16 is a diagram showing a display example of a display screen for specifically explaining the registration procedure of the one-click icon.

Then, the edit key b12 is selected on the screen of FIG. 15, to display the editing condition setting screen. As shown in FIG. 16, when the radio button d31 for selecting a staple is selected on the editing condition setting screen, five icons, i.e., an icon I21 indicating the printing result of the upper left staple, an icon I22 indicating the printing result of the upper right staple, an icon I23 indicating the printing result of the left oblique staple, and an icon I24 indicating the printing result of the left two staples are displayed in the staple (parts) icon display area a31.

In this staple (parts) icon display area a31, when the upper left staple icon I21 is selected, an icon I102 where the upper left staple image is drawn on the icon I101 shown in FIG. 15 is displayed in the one-click icon display area a31. The icon I102 is obtained by overwriting the upper left staple image on the icon I101 (see FIG. 15). As a result, a one-click icon indicating the printing result of aggregation 1/2 (printing from left to right), with a partition line and an upper left staple is prepared.

Then, in FIG. 16, when the store with a name key b18 is selected, the one-click icon registration screen shown in FIG. 12 is displayed, and "aggregation 1/2, staple: upper left" is input as the set name in the one-click set name input area a41, and a comment related to the one-click icon is input in the comment input area of one-click setting. Thereafter, when the OK key b41 is selected, the set name "aggregation 1/2, staple: upper left", the comment, the prepared one-click icon I102 are registered associated with the selected printing functions ("aggregation 1/2 (printing from left to right), with a partition line and an upper left staple) in the printer driver 17c (recording medium 17).

Figure 17:
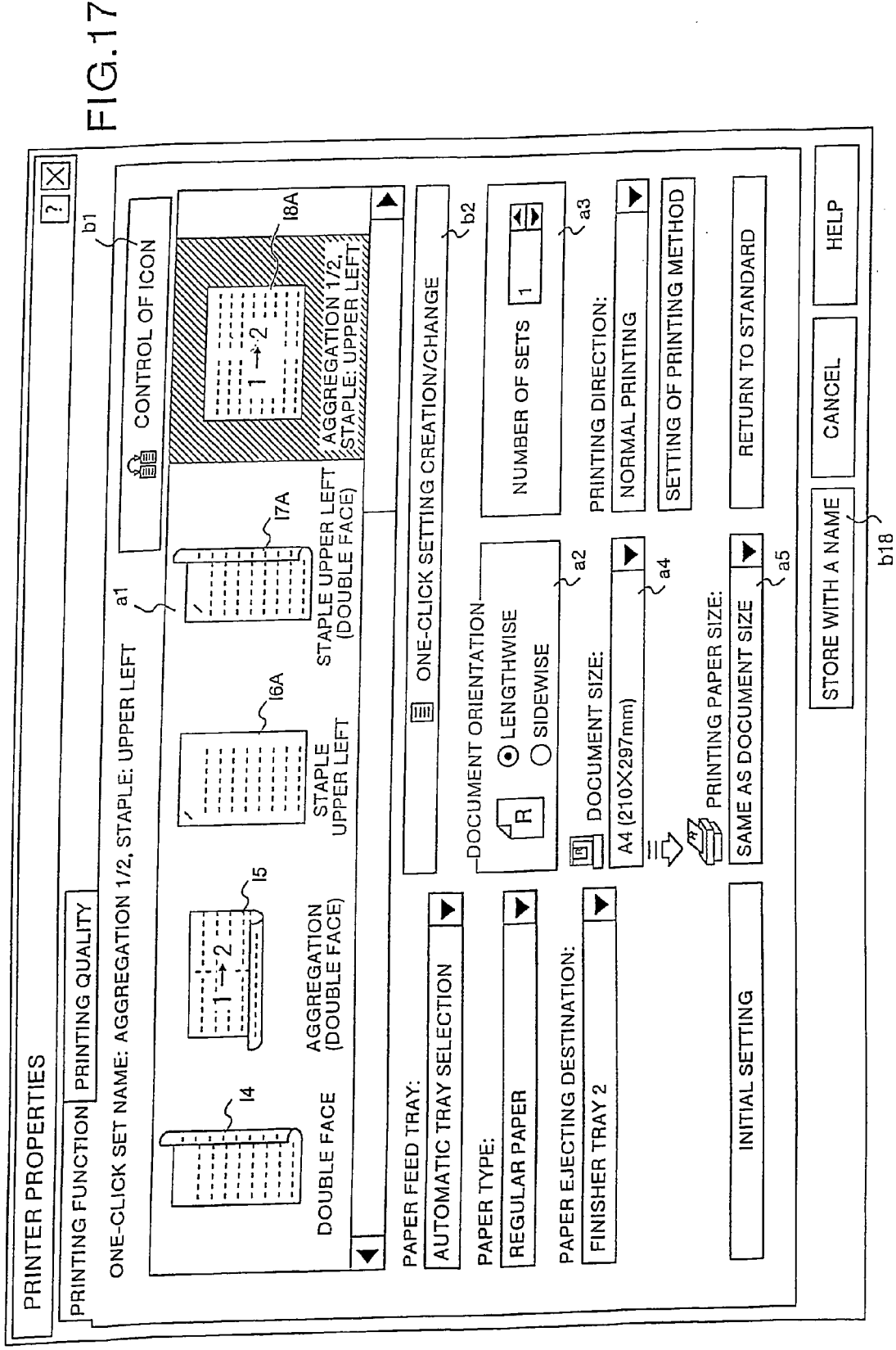
FIG. 17 is a diagram showing a display example of a display screen for specifically explaining the registration procedure of the one-click icon.

This registered one-click icon is displayed, as shown in FIG. 17, in the one-click icon display area a1 on the printing function setting screen. When this icon I8A of the set name "aggregation 1/2, staple: upper left" is selected, the printing condition of aggregation 1/2 (printing from left to right), with a partition line and an upper left staple are automatically set.

Other icons shown in the one-click icon display area a1 include "double face" I4, "aggregation (double face)" I5, "staple upper left" I6A, and staple upper left (double face)" I7A.

A specific procedure for preparing the one-click icon representing the functions of "double face", "stamp" and "punch" will now be described with reference to FIG. 18 to FIG. 21.

First, the "icon I1 (set name: normal)" is selected as the standard icon from icons displayed in the icon display area a1 on the printing function setting screen shown in FIG. 7, and the orientation "lengthwise" is selected in the document orientation selection area a2. Then, when the one-click setting creation/change key b2 is selected, the editing condition setting screen shown in FIG. 9 is displayed.

In the editing condition setting screen shown in FIG. 9, the set name "normal" selected in the icon display area a1 on the printing function setting screen shown in FIG. 7 is displayed in the one-click icon set name display area a2. In the one-click icon display area a11, the "icon I1 (set name: normal)" selected in the icon display area a1 in FIG. 7 is displayed.

Figure 18:
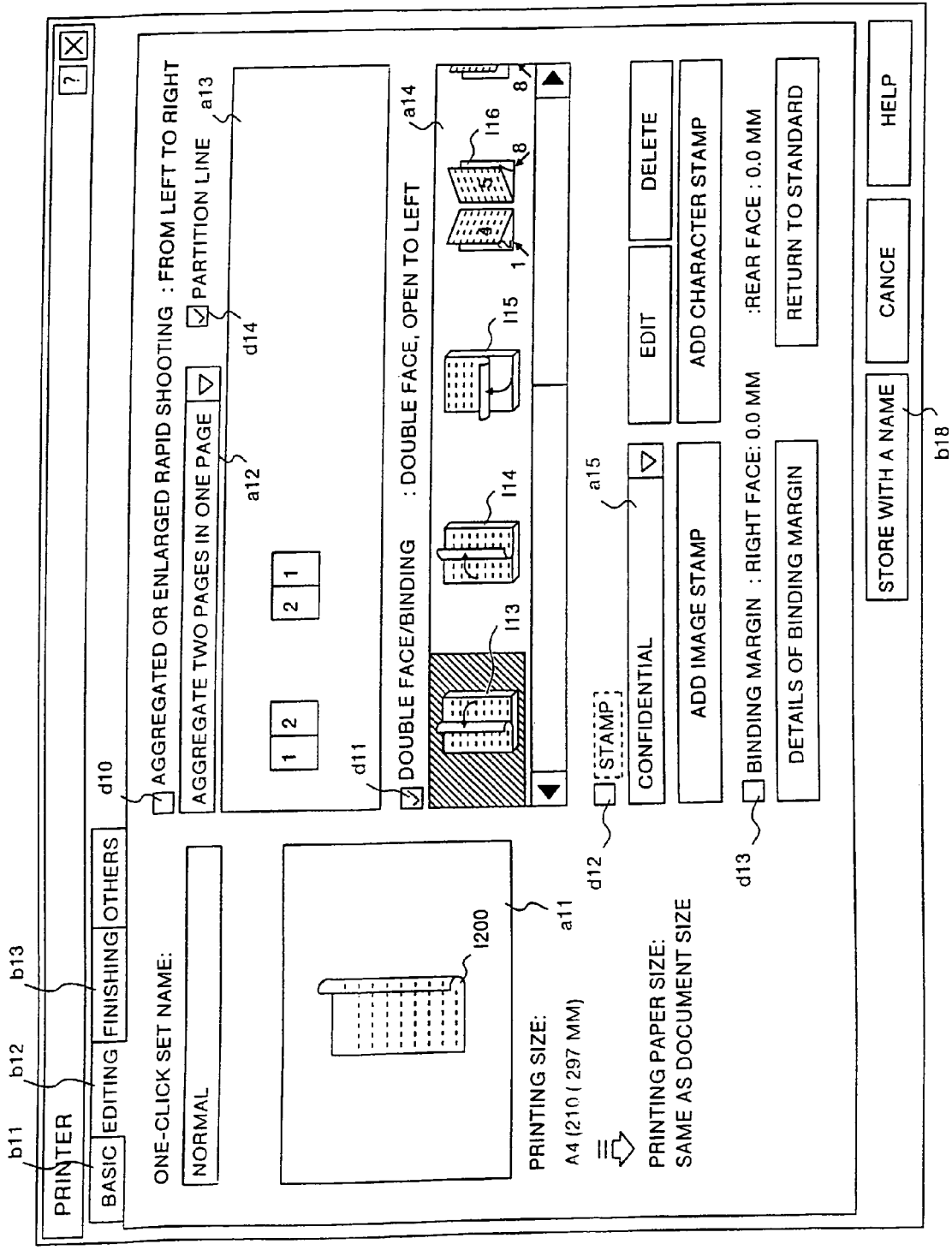
FIG. 18 is a diagram showing a display example of a display screen for specifically explaining the registration procedure of the one-click icon.

As shown in FIG. 18, when the radio button d11 for selecting reversing and binding is selected, in the reversing/binding parts icon display area a14, icons I13 to I15 indicating the printing results of reversing and binding are displayed. When the icon I16 indicating the double face printing result is selected in the reversing/binding parts icon display area a14, an icon I200 indicating the double face printing result is displayed in the one-click icon display area a1. This icon is obtained by overwriting the double face image on the document base image.

Figure 19:
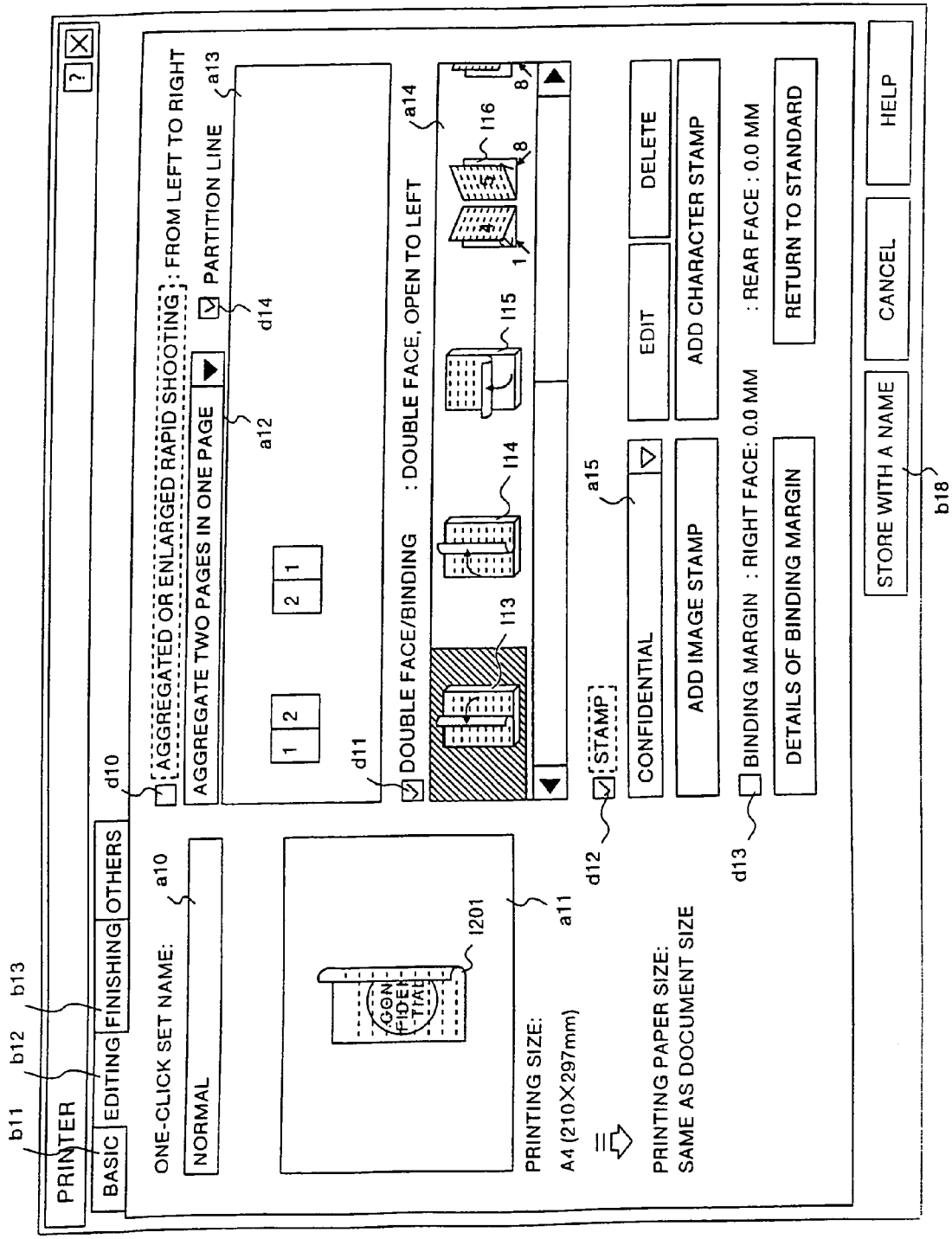
FIG. 19 is a diagram showing a display example of a display screen for specifically explaining the registration procedure of the one-click icon.

Subsequently, as shown in FIG. 19, when the radio button d3 for selecting a stamp is selected, stamps are displayed in the stamp type selection area a15 for selecting the stamp type. In this stamp type selection area a15, when a cursor key is operated to select "confidential", an icon I201 in which the character "confidential" is drawn on the icon I200 (see FIG. 18) is displayed in the one-click icon set name display area a2. This icon is obtained by overwriting the character image of "confidential" on the icon I200 (see FIG. 18).

Figure 20:
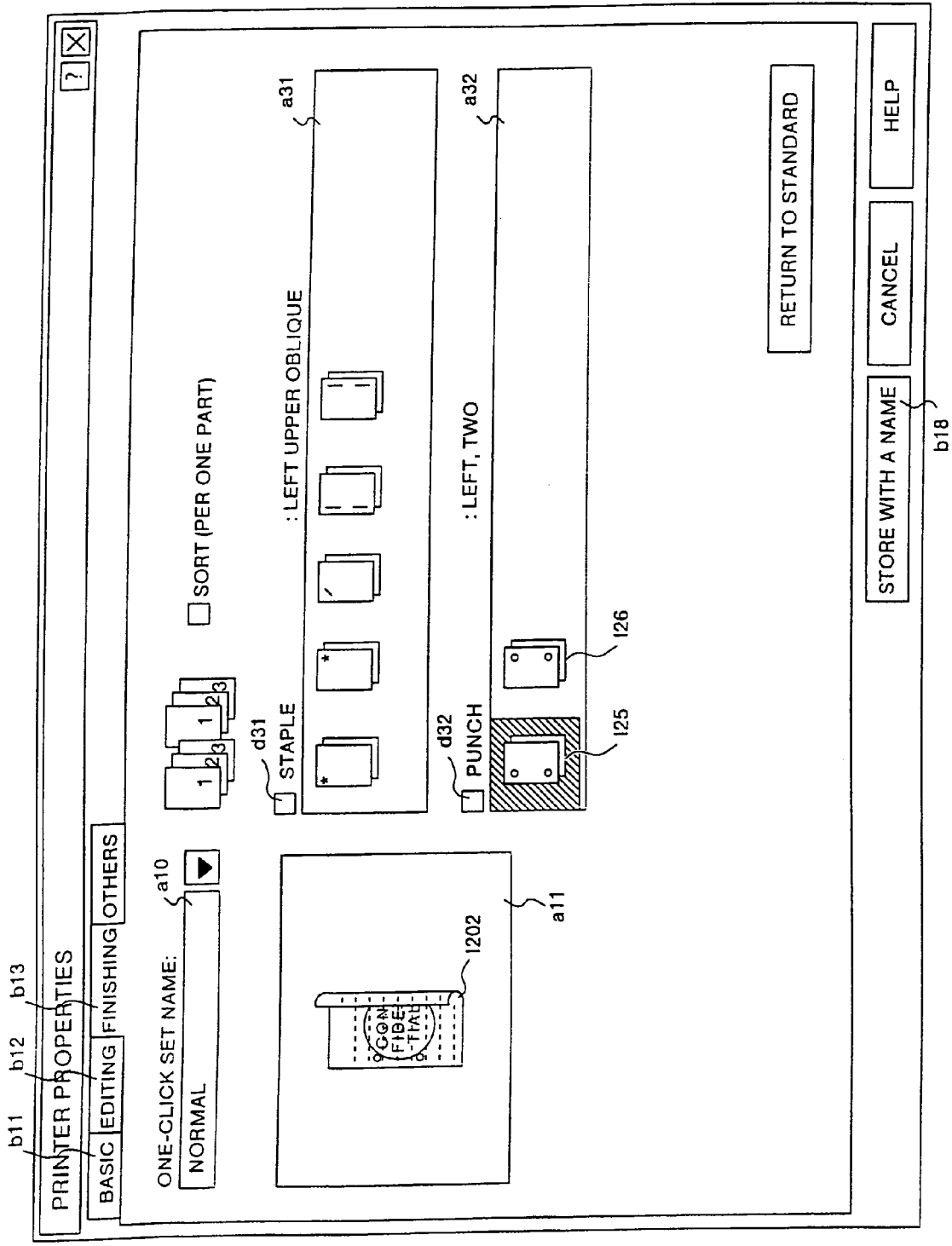
FIG. 20 is a diagram showing a display example of a display screen for specifically explaining the registration procedure of the one-click icon.

When the finishing key b13 on the screen shown in FIG. 19 is selected to display the finishing condition setting screen, and when the radio button d32 for selecting punch is selected as shown in FIG. 20, an icon I25 indicating the printing result of left side punching and an icon I26 indicating the printing result of right side punching are displayed in the punch (parts) icon display area a32. When the icon I25 indicating the printing result of left side punching is selected, an icon I202 in which the left side punching image is drawn on the icon I201 (see FIG. 19) is displayed in the one-click icon display area a1. This icon is obtained by overwriting the left side punch image on the icon I201 (see FIG. 19).

In FIG. 20, when the store with a name key b18 is selected, the one-click icon registration screen shown in FIG. 12 is displayed. "Double face, stamp, punch" is input as the one-click name in the one-click set name input area a41, and a comment related to the prepared one-click icon is input in the comment input area a42 of one-click setting, and thereafter, when the OK key b42 is selected, the set name "double face, stamp, punch", the comment, the prepared one-click icon I202 are registered associated with the selected printing functions (reversing, stamping and left side punching) in the printer driver.

Figure 21:
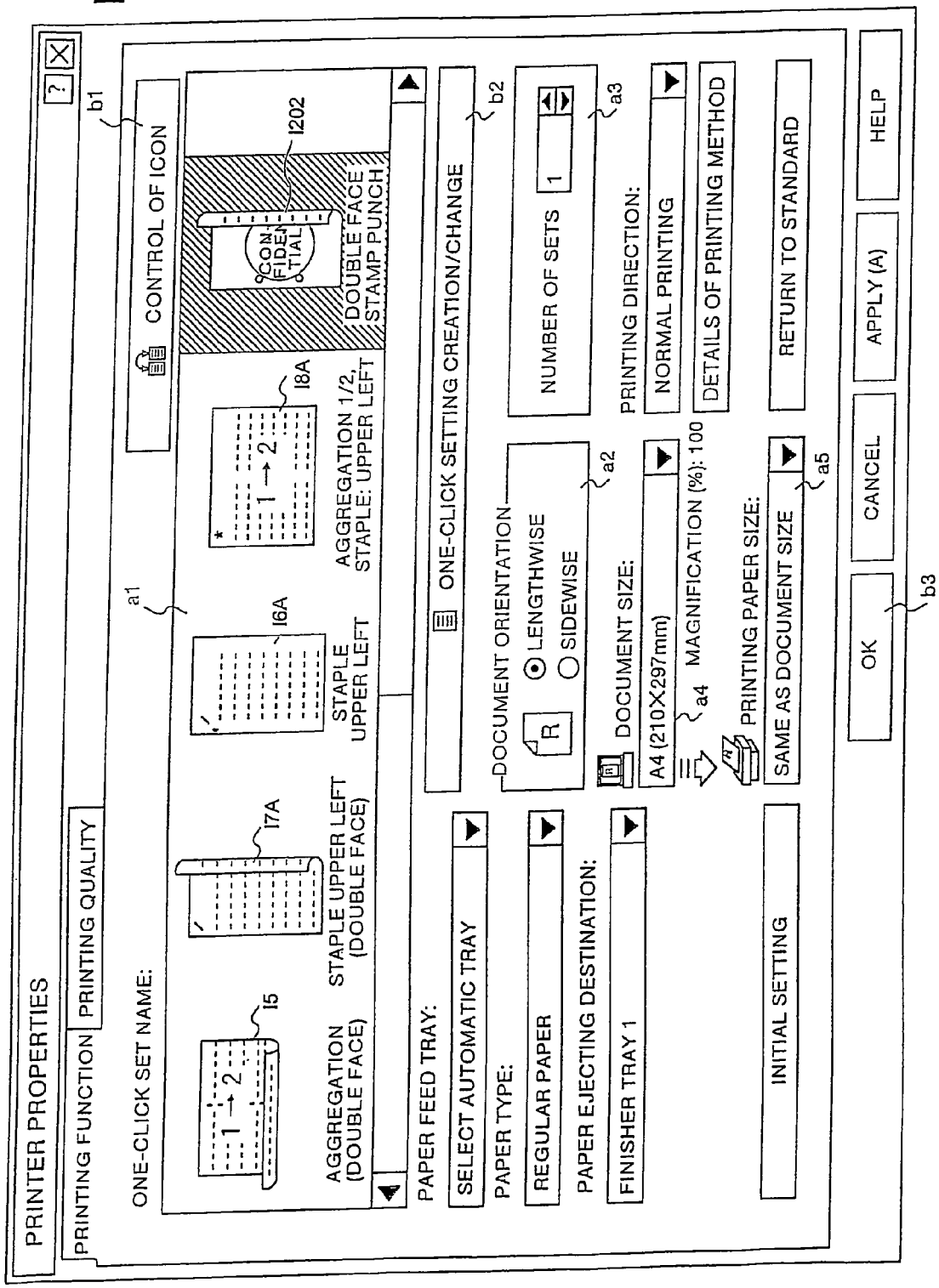
FIG. 21 is a diagram showing a display example of a display screen for specifically explaining the registration procedure of the one-click icon.

This registered one-click icon is displayed in the one-click icon display area a1 on the printing function setting screen, as shown in FIG. 21. When the icon I202 of this set name "double face, stamp, punch" is selected, the corresponding printing functions (reversing, stamping and left side punching) are automatically set.

(4) Printing Operation Using the One-Click Icon

Figure 22:
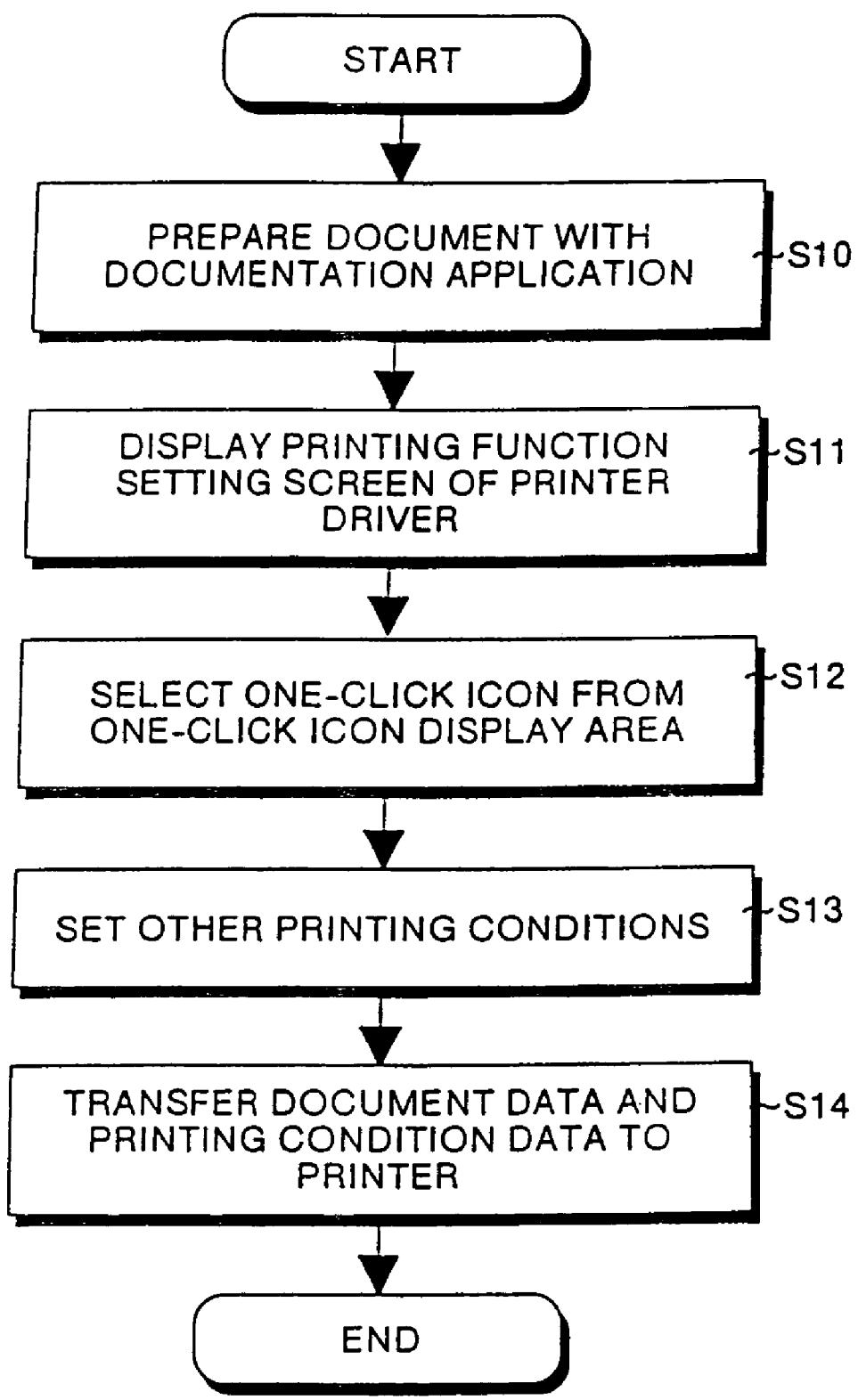
FIG. 22 is a flowchart for explaining the procedure in the case of printing document data, using the one-click icon of the printer driver.

Next, the procedure in the case of printing document data will now be described with reference to the flowchart in FIG. 22, using the one-click icon of the printer driver 17c. FIG. 22 shows a flowchart for explaining the procedure when the document data is printed, using the one-click icon of the printer driver 17c.

In FIG. 22, at first, a document is prepared with the document preparing application (step S10), and the printer driver 17c is activated on the display screen of the document preparing application 17b, to thereby display the printing function setting screen (see FIG. 7) of the printer driver (step S11). Subsequently, when a desired one-click icon is selected from the one-click icons displayed in the icon display area a1 on the printing function setting screen (step S12), the printing condition registered corresponding to the selected one-click icon is automatically set. After other printing conditions (paper feed tray, paper type, paper ejecting destination, number of sets, etc.) are set (step S13), when the OK button b3 is selected, the printing condition data such as the printing condition registered corresponding to the one-click icon and other printing conditions, and the document data are transferred from the personal computer 1 to the printer 2 (step S14). According thereto, the printer prints the document data in accordance with the transferred printing condition data.

As described above, with the printer driver 17c in this embodiment, a list of one-click icons, each representing one or a plurality of printing functions, is displayed in the icon display area a1, and one one-click icon is selected from the list of the one-click icons displayed in the icon display area a1, and a plurality of printing functions corresponding to the selected one-click icons are automatically set. As a result, when the printing data is printed by the printer, the printing function of the printer can be easily set.

Moreover, with the printer driver 17c in this embodiment, a plurality of printing functions are selected on the one-click icon setting screen (editing condition setting screen, finishing condition setting screen and basic condition setting screen), and a one-click icon representing the selected plurality of printing functions is prepared, and displayed in the one-click icon display area al1 on the display screen, so that the selected plurality of printing functions are registered associated with the one-click icon representing a plurality of printing functions and the set name. As a result, users can prepare a one-click icon representing a plurality of desired printing functions, and automatically set a plurality of printing functions by selecting the prepared one-click icon, and hence user-friendliness can be provided.

As described above, according to the information processing device and the information processing method of this invention, when the printing data is printed by a printer, it becomes possible to set the printing function of the printer very easily.

Moreover, a user can prepare a symbol representing a plurality of desired printing functions, and can set a plurality of printing functions by selecting the prepared symbol, thereby user-friendliness can be provided.

Furthermore, a user can confirm the preparation process of a symbol representing a plurality of printing functions.

Moreover, a user can easily select the printing functions.

Furthermore, it becomes possible to prepare a symbol representing a plurality of printing functions with an easy method.

Moreover, as the printing function, the paper direction, the reversing function, the aggregation function, the binding function, the stapling function, the punching function and the scaling function can be selected.

Furthermore, the symbols can be rearranged corresponding to the use frequency of the user, and hence user-friendliness can be provided.

The computer program according to this invention, which when executed on a computer realizes the method according to the present invention. Thus, the computer program can be easily distributed among the users by distributing the computer readable recording medium. Moreover, the method according to the present invention can be easily and automatically realized using the computer.

The present document incorporates by reference the entire contents of Japanese priority document, 2000-376718 filed in Japan on Dec. 11, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of operating a printing system, comprising:
displaying, on a user interface, graphical representations corresponding to printing parameters available for user selection;
selecting, using the user interface, settings of one or more of the printing parameters available for user selection;
displaying a graphical representation of a sheet which emulates a print output having the parameters which have been selected, the graphical representation of the sheet being a different display than the graphical representations corresponding to printing parameters available for user selection;
selecting, using the user interface, an alternative group of different printing parameters available for user selection;
displaying, on the user interface, alternative printing parameters of the alternative group of different printing parameters available for user selection which can be selected while maintaining a display of the graphical representation of the sheet which emulates the print output having the parameters which have been selected;
selecting, using the user interface, one or more of the alternative printing parameters;
displaying, on the user interface, the graphical representation of the sheet having a graphical representation of the one or more alternative printing parameters which have been selected; and
registering, in a computer memory, an icon which corresponds to the one or more of the alternative printing parameters which have been selected by the user interface.

2. The method of claim 1, wherein:
the registering of the icon comprises registering, in the computer memory, the graphical representation of the sheet having the graphical representation of the one or more alternative printing parameters which have been selected.

3. The method of claim 1, further comprising:
displaying, simultaneously on the user interface, the graphical representation of the sheet having the graphical representation of the one or more alternative printing parameters which have been selected and an icon corresponding to a process to register at least the one or more alternative printing parameters which have been selected;

receiving, using the user interface, a user input selecting the icon corresponding to the process to register at least the one or more alternative printing parameters which have been selected; and displaying, on the user interface, a registration interface.

4. The method of claim 1, wherein the registering comprises:

registering, in the computer memory, the icon which is a graphical representation that is customized to reflect at least the one or more alternative printing parameters which have been selected.

5. The method of claim 1, wherein the registering further comprises:

registering, using the user interface, at least one of a name and a comment corresponding to the icon.

6. The method of claim 1, wherein the selecting the alternative group of different printing parameters available for user selection comprises:

selecting, using the user interface, one of a plurality of tabs which are displayed, and the graphical representation of the sheet which emulates the print output continues to be displayed after one of the tabs is selected.

7. The method of claim 6, wherein the selecting the alternative group of different printing parameters available for user selection comprises:

selecting, using the user interface, a tab for finishing parameters.

8. The method of claim 6, wherein the selecting the alternative group of different printing parameters available for user selection comprises:

selecting, using the user interface, a tab which provides a selection for aggregating two pages on one page.

9. A tangible computer readable medium which stores instructions of a printer driver which uses a computer to perform a method of information processing, the method comprising:

displaying, on a user interface, graphical representations corresponding to printing parameters available for user selection;

selecting, using the user interface, settings of one or more of the printing parameters available for user selection;

displaying a graphical representation of a sheet which emulates a print output having the parameters which have been selected, the graphical representation of the sheet being a different display than the graphical representations corresponding to printing parameters available for user selection;

selecting, using the user interface, an alternative group of different printing parameters available for user selection;

displaying, on the user interface, alternative printing parameters of the alternative group of different printing parameters available for user selection which can be selected while maintaining a display of the graphical representation of the sheet which emulates the print output having the parameters which have been selected;

selecting, using the user interface, one or more of the alternative printing parameters;

displaying, on the user interface, the graphical representation of the sheet having a graphical representation of the one or more alternative printing parameters which have been selected; and registering, in a computer memory, an icon which corresponds to the one or more of the alternative printing parameters which have been selected by the user interface.

10. The tangible computer readable medium of claim 9, wherein:

the registering of the icon comprises registering, using the user interface, the graphical representation of the sheet having the graphical representation of the one or more alternative printing parameters which have been selected.

11. The tangible computer readable medium of claim 9, wherein the method further comprises:

displaying, simultaneously on the user interface, the graphical representation of the sheet having the graphical representation of the one or more alternative printing parameters which have been selected and an icon corresponding to a process to register at least the one or more alternative printing parameters which have been selected;

receiving, using the user interface, a user input selecting the icon corresponding to the process to register at least the one or more alternative printing parameter which has been selected; and displaying, on the user interface, a registration interface.

12. The tangible computer readable medium of claim 9, wherein the registering further comprises:

registering, using the user interface, the icon which is a graphical representation that is customized to reflect at least the one or more alternative printing parameters which have been selected.

13. The tangible computer readable medium of claim 12, wherein the registering further comprises:

registering, using the user interface, at least one of a name and a comment corresponding to the icon.

14. The tangible computer readable medium of claim 9, wherein the selecting the alternative group of different printing parameters available for user selection comprises:

selecting, using the user interface, one of a plurality of tabs which are displayed.

15. The tangible computer readable medium of claim 14, wherein the selecting the alternative group of different printing parameters available for user selection comprises:

selecting, using the user interface, a tab for finishing parameters, and the graphical representation of the sheet which emulates the print output continues to be displayed after one of the tabs is selected.

16. The tangible computer readable medium of claim 14, wherein the selecting the alternative group of different printing parameters available for user selection comprises:

selecting, using the user interface, a tab which provides a selection for aggregating two pages on one page.

17. A system for controlling a printer, comprising:

a user interface;

a device configured to display, on the user interface, graphical representations corresponding to printing parameters available for user selection;

a device configured to select, using the user interface, settings of one or more of the printing parameters available for user selection;

a device configured to display, using the user interface, a graphical representation of a sheet which emulates a print output having the parameters which have been selected, the graphical representation of the sheet being a different display than the graphical representations corresponding to printing parameters available for user selection;

a device configured to select, using the user interface, an alternative group of different printing parameters available for user selection;

a device configured to display, on the user interface, alternative printing parameters of the alternative group of different printing parameters available for user selection which can be selected while maintaining a display of the graphical representation of the sheet which emulates the print output having the parameters which have been selected;

a device configured to select, using the user interface, one or more of the alternative printing parameters;

a device configured to display, on the user interface, the graphical representation of the sheet having a graphical representation of the one or more alternative printing parameters which have been selected; and a device configured to register an icon which corresponds to the one or more of the alternative printing parameters which have been selected by the user interface.

18. The system of claim 17, wherein:

the device configured to register the icon comprises a device configured to register, using the user interface, the graphical representation of the sheet having the graphical representation of the one or more alternative printing parameters which have been selected.

19. The system of claim 18, further comprising:

the printer which is configured to print using the one or more alternative printing parameters which has been selected.

20. The system of claim 17, further comprising:

a device configured to display, simultaneously on the user interface, the graphical representation of the sheet having the graphical representation of the one or more alternative printing parameters which have been selected and an icon corresponding to a process to register at least the one or more alternative printing parameters which have been selected;

a device configured to receive a user input selecting, using the user interface, the icon corresponding to the process to register at least the one or more alternative printing parameters which have been selected; and a device configured to display, on the user interface, a registration interface.

21. The system of claim 20, further comprising:

the printer which is configured to print using the one or more alternative printing parameters which has been selected.

22. The system of claim 17, wherein the device configured to register comprises:

a device configured to register, using the user interface, the icon which is a graphical representation that is customized to reflect at least the one or more alternative printing parameters which have been selected.

23. The system of claim 22, wherein the device configured to register further comprises:

a device configured to register, using the user interface, at least one of a name and a comment corresponding to the icon.

24. The system of claim 23, further comprising:

the printer which is configured to print using the one or more alternative printing parameters which has been selected.

25. The system of claim 22, further comprising:

the printer which is configured to print using the one or more alternative printing parameters which has been selected.

26. The system of claim 17, wherein the device configured to select the alternative group of different printing parameters available for user selection comprises:

a device configured to select, using the user interface, one of a plurality of tabs which are displayed, and the graphical representation of the sheet which emulates the print output continues to be displayed after one of the tabs is selected.

27. The system of claim 26, wherein the device configured to select the alternative group of different printing parameters available for user selection comprises:

a device configured to select, using the user interface, a tab for finishing parameters.

28. The system of claim 26, wherein the device configured to select the alternative group of different printing parameters available for user selection comprises:

a device configured to select, using the user interface, a tab which provides a selection for aggregating two pages on one page.

29. The system of claim 26, further comprising:

the printer which is configured to print using the one or more alternative printing parameters which has been selected.

30. The system of claim 17, further comprising:

the printer which is configured to print using the one or more alternative printing parameters which has been selected.

* * * * *